US 11,979,639 B2

(12) United States Patent
Murray

(10) Patent No.: US 11,979,639 B2
(45) Date of Patent: *May 7, 2024

(54) FIRST-SCREEN NAVIGATION WITH CHANNEL SURFING, BACKDROP REVIEWING AND CONTENT PEEKING

(71) Applicant: Google LLC, Mountain View, CA (US)

(72) Inventor: Craig Murray, Spring Hill, TN (US)

(73) Assignee: Google LLC, Mountain View, CA (US)

( * ) Notice: Subject to any disclaimer, the term of this patent is extended or adjusted under 35 U.S.C. 154(b) by 117 days.

This patent is subject to a terminal disclaimer.

(21) Appl. No.: 17/473,177

(22) Filed: Sep. 13, 2021

(65) Prior Publication Data

US 2021/0409831 A1 Dec. 30, 2021

Related U.S. Application Data

(63) Continuation of application No. 16/555,250, filed on Aug. 29, 2019, now Pat. No. 11,122,338, which is a
(Continued)

(51) Int. Cl.
*H04N 21/482* (2011.01)
*H04N 21/258* (2011.01)
(Continued)

(52) U.S. Cl.
CPC ..... *H04N 21/482* (2013.01); *H04N 21/25891* (2013.01); *H04N 21/266* (2013.01);
(Continued)

(58) Field of Classification Search
CPC .............. H04N 21/482; H04N 21/266; H04N 21/2668; H04N 21/4126; H04N 21/4227;
(Continued)

(56) References Cited

U.S. PATENT DOCUMENTS 7,046,161 B2 * 5/2006 Hayes ................... G08C 19/28
340/12.25
2004/0205155 A1 10/2004 Nobakht et al.
(Continued)

FOREIGN PATENT DOCUMENTS

| EP | 0575956 | 12/1993 |
|---|---|---|
| WO | WO 2013127470 | 9/2013 |
| WO | WO 2014028073 | 2/2014 |

OTHER PUBLICATIONS

Examination Report dated Mar. 19, 2021 in EP Patent Application No. 18708282.1.
(Continued)

*Primary Examiner* — Chenea Davis
(74) *Attorney, Agent, or Firm* — Kilpatrick Townsend & Stockton LLP

(57) ABSTRACT

A method is implemented at an Internet-connected remote control device for reviewing content channels on an Internet-connected display device that is associated with the remote control device via a user account maintained at a server. In response to receiving a user actuation of a user button, the remote control identifies a first Internet content channel that is currently being displayed on the display device, and obtains a preferred channel list including a sequence of Internet content channels that is associated with the user account and includes the first Internet content channel. The remote control then identifies a second Internet content channel that follows the first Internet content channel in the preferred channel list, and transmits to the server a first channel change message including information of the second Internet content channel to cause the Internet-connected display device to display media content provided by the second content channel.

20 Claims, 14 Drawing Sheets

Related U.S. Application Data continuation of application No. 15/496,825, filed on Apr. 25, 2017, now Pat. No. 10,405,051.

(51) Int. Cl.

| | |
|---|---|
| *H04N 21/266* | (2011.01) |
| *H04N 21/2668* | (2011.01) |
| *H04N 21/41* | (2011.01) |
| *H04N 21/422* | (2011.01) |
| *H04N 21/4227* | (2011.01) |
| *H04N 21/45* | (2011.01) |
| *H04N 21/462* | (2011.01) |
| *H04N 21/61* | (2011.01) |
| *H04N 21/633* | (2011.01) |
| *H04W 84/12* | (2009.01) |

(52) U.S. Cl.
CPC ... *H04N 21/2668* (2013.01); *H04N 21/41265* (2020.08); *H04N 21/4221* (2013.01); *H04N 21/4227* (2013.01); *H04N 21/4532* (2013.01); *H04N 21/4622* (2013.01); *H04N 21/4826* (2013.01); *H04N 21/6125* (2013.01); *H04N 21/633* (2013.01); *H04N 21/42209* (2013.01); *H04N 21/42215* (2013.01); *H04N 21/4222* (2013.01); *H04W 84/12* (2013.01)

(58) Field of Classification Search
CPC .. H04N 21/4622; H04N 21/633; H04W 84/12
See application file for complete search history.

(56) References Cited

U.S. PATENT DOCUMENTS

| | | | | |
|---|---|---|---|---|
| 2009/0244402 | A1* | 10/2009 | Rye | G08C 17/00 |
| | | | | 348/734 |
| 2010/0031288 | A1* | 2/2010 | Scott | H04N 7/17318 |
| | | | | 725/38 |
| 2011/0209177 | A1* | 8/2011 | Sela | H04N 7/17318 |
| | | | | 725/39 |
| 2011/0289536 | A1* | 11/2011 | Poder | H04H 60/97 |
| | | | | 725/95 |
| 2014/0059628 | A1* | 2/2014 | Kuo | H04N 21/4122 |
| | | | | 725/109 |
| 2014/0157320 | A1 | 6/2014 | Chang et al. | |
| 2015/0020091 | A1* | 1/2015 | Roberts | G11B 27/28 |
| | | | | 725/28 |
| 2015/0140896 | A1* | 5/2015 | Maiti | A63H 33/26 |
| | | | | 446/484 |
| 2015/0312636 | A1* | 10/2015 | Demerchant | H04N 21/4345 |
| | | | | 725/47 |
| 2017/0188201 | A1* | 6/2017 | Cansino | H04W 4/046 |

OTHER PUBLICATIONS

Fields, J., Samsung's 2013 Smart Platform: Explained, last updated Jul. 21, 2015, pp. 1-6, available at: https://www.reviewed.com/televisions/features/samsung-s-2013-smart-platform-explained.

International Search Report and Written Opinion dated May 3, 2018 in International Patent Application No. PCT/US2018/018385.

Notice of Allowance dated Apr. 18, 2019 in U.S. Appl. No. 15/496,825.

Notice of Allowance dated May 13, 2021 in U.S. Appl. No. 16/555,250.

Office Action dated Jan. 25, 2019 in U.S. Appl. No. 15/496,825.

Office Action dated Feb. 4, 2021 in U.S. Appl. No. 16/555,250.

Office Action dated Jun. 6, 2018 in U.S. Appl. No. 15/496,825.

Office Action dated Nov. 2, 2018 in U.S. Appl. No. 15/496,825.

Samsung, "2014 Smart Hub", last accessed Mar. 28, 2019, pp. 1, available at: https://www.samsung.com/ae/.

Smarty, A. "3 YouTube Tools To Create An Easy Lean-Back TV Experience", last updated Nov. 8, 2010, pp. 1-3, available at: https://www.makeuseof.com/tag/3-youtube-tools-create-easy-leanback-tv-experience/.

Written Opinion dated Mar. 4, 2019 in International Patent Application No. PCT/US2018/018385.

YouTube Official Blog, "YouTube Leanback Offers Effortless Viewing", last updated Jul. 4, 2010, pp. 1-2, available at: https://youtube.googleblog.com/2010/07/youtube-leanback-offers-effortless.html.

YouTube, "Android TV—A Platform For the Living Room", last updated Jun. 25, 2014, pp. 1, available at: https://www.youtube.com/watch?v=y3dCUPeyhag.

* cited by examiner

FIRST-SCREEN NAVIGATION WITH CHANNEL SURFING, BACKDROP REVIEWING AND CONTENT PEEKING

CROSS-REFERENCE TO RELATED APPLICATIONS

This application is a continuation of U.S. patent application Ser. No. 16/555,250, filed Aug. 29, 2019, which is a continuation of U.S. patent application Ser. No. 15/496,825, filed Apr. 25, 2017, each of which is hereby incorporated by reference herein in its entirety.

TECHNICAL FIELD

This application relates generally to computer technology, including but not limited to methods and systems for controlling display of media content on one or more output display devices within a smart media display environment based on user proximity and/or location detected with respect to one or more casting devices.

BACKGROUND

Media display devices are employed to stream a variety of media content (e.g., TV, movies, live broadcasts, personal video, etc.) provided via a network to a display device. Media display devices include a variety of connected display devices, such as smart phones, set top boxes, or connected television devices. The casting devices and smart television devices are often controlled via remote control interfaces that can be displayed directly on the media display devices or separately on a second screen mobile device (e.g., a tablet computer, laptop, or mobile phone). A user can browse through a list of content items and search for media content on remote control interfaces displayed on the media display devices or the second screen mobile devices.

Compared with conventional television devices and traditional remote controls, a typical remote control interface for a media streaming device often provides a comprehensive but complicated user experience that can be overwhelming and hard for users to follow. For example, such a remote control interface might require a user to navigate multiple menus and/or type on an awkward keyboard (virtual or physical) to reach a destination related to desired media content, whether that is a web site or a media steaming service. Even worse, when a user does not have a particular program or channel in mind to watch, typical remote control interfaces for media streaming devices offer little user guidance and also do not facilitate an easy and convenient behavior for browsing available content (e.g., similar to: channel surfing" using a conventional remote control and television device. In addition, when a second screen mobile device (such as a smart phone) or another remote control device is used to control display of media content via a remote control interface, the resulting user experience is generally less intuitive than the first screen experience offered by conventional television devices and remote controls due in part to the inherent complexity of such second screen mobile devices.

Providing further complexity, content preview and secondary information (e.g., related news feeds and images) that can be provided on a remote control interface for a media streaming device can distract from content being displayed on a primary display regardless of whether that additional information is displayed on a second screen device (such as a smart phone) or alongside media content on the primary display.

Therefore, there is a need for convenient and intuitive remote control interfaces for controlling content displayed via casting devices, media streaming and smart television devices.

SUMMARY

Accordingly, this application is directed to an Internet-connected remote control having a plurality of buttons. The remote control is disposed in proximity to a display device and configured to control display of media content received from a plurality of content channels on the display device, and the display device is associated with an Internet-enabled casting device configured to receive the media content from the one or more content channels. When the display device displays the media content from these content channels, the plurality of buttons of the remote control creates first screen experience similar to those available to conventional television devices. Specifically, the remote control includes a quick cast button that immediately plays media content provided by one of the content channels, a cycle button that sequentially launches content associated with a list of selected content channels (e.g., Netflix and YouTube), and a previous/next button that allows forwarding and rewinding among different programs in a specific channel. In some implementations, the remote control includes a dedicated button for previewing upcoming content associated with a program that is currently displayed on the display device or displaying backdrop information related to the media content currently displayed on the display device. Alternatively, the remote control configures an existing button (e.g., by requiring an extended button holding time) to trigger any of the above media control functions for the display device.

In accordance with one aspect of this application, a method of reviewing content channels on an Internet-connected display device is implemented at an Internet-connected remote control device having a first user button, one or more processors and memory storing one or more programs for execution by the one or more processors. The remote control device and the display device are associated with a first user account maintained at a server. The method includes in response to receiving a user actuation of the first user button, identifying a first Internet content channel that is currently being displayed on the display device and obtaining a preferred channel list that includes a sequence of Internet content channels that is associated with the first user account and that is arranged according to a predetermined channel order. The sequence of Internet content channels includes the first Internet content channel. The method further includes in accordance with the preferred channel list, identifying a second Internet content channel that follows the first Internet content channel in the preferred channel list, and transmitting to the server a first channel change message including information of the second Internet content channel to cause the Internet-connected display device to display media content provided by the second content channel.

In accordance with another aspect of this application, an electronic device is configured to enable reviewing content channels on an Internet-connected display device. The electronic device includes one or more processors, and memory storing one or more programs to be executed by the one or more processors. The one or more programs further include instructions for implementing the operations of the above method for reviewing the content channels on the Internet-connected display device.

In accordance with another aspect of this application, a non-transitory storage medium stores one or more programs to be executed by one or more processors. The one or more programs further include instructions for implementing the operations of the above method for reviewing the content channels on the Internet-connected display device.

In accordance with some implementations, an electronic device includes means for performing the operations of any of the methods described above.

In accordance with another aspect of this application, a method of reviewing content channels on an Internet-connected display device is implemented at an Internet-enabled casting device having one or more processors and memory storing one or more programs for execution by the one or more processors. The Internet-enabled casting device, an Internet-based remote control device and the Internet-connected display device are associated with a first user account maintained at a server. The method includes in response to a user actuation on a first button of the remote control device, identifying a first Internet content channel that is currently being displayed on the display device and obtaining a preferred channel list that includes a sequence of Internet content channels that is associated with the first user account and that is arranged according to a predetermined channel order. The sequence of Internet content channels includes the first Internet content channel. The method further includes in accordance with the preferred channel list, identifying a second Internet content channel that follows the first Internet content channel in the preferred channel list, and causing the Internet-connected display device to display media content provided by the second content channel.

In accordance with another aspect of this application, a method of reviewing content channels on an Internet-connected display device is implemented at a server having one or more processors and memory storing one or more programs for execution by the one or more processors. The server is coupled to the Internet-connected display device and an Internet-connected remote control device that are associated with a first user account maintained at the server. The method includes in response to a user actuation on a first button of the remote control device, identifying a first Internet content channel that is currently being displayed on the display device and obtaining a preferred channel list that includes a sequence of Internet content channels that is associated with the first user account and that is arranged according to a predetermined channel order. The sequence of Internet content channels includes the first Internet content channel. The method further includes in accordance with the preferred channel list, identifying a second Internet content channel that follows the first Internet content channel in the preferred channel list, and sending a first channel change message including information of the second content channel to cause the Internet-connected display device to display media content provided by the second content channel.

BRIEF DESCRIPTION OF THE DRAWINGS

For a better understanding of the various described implementations, reference should be made to the Description of Implementations below, in conjunction with the following drawings in which like reference numerals refer to corresponding parts throughout the figures.

Like reference numerals refer to corresponding parts throughout the several views of the drawings.

DESCRIPTION OF IMPLEMENTATIONS

Figure 1:
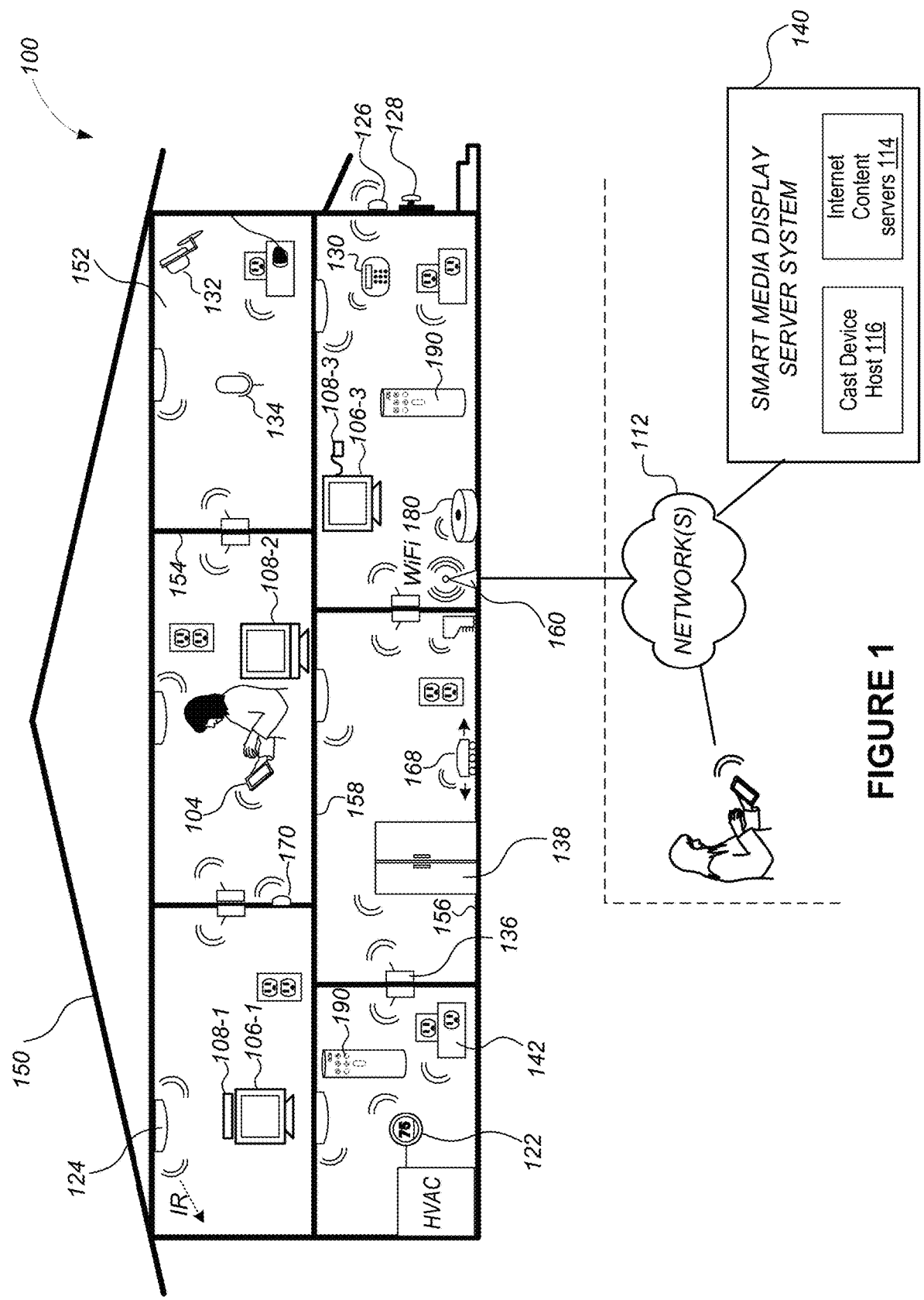
FIG. 1 is an example smart media display environment in accordance with some implementations.

In various implementations of the application, a smart media environment includes at least one display device that is controlled by an Internet-connected remote control for playing media content received from a plurality of Internet content channels. Specifically, in some implementations, the Internet-connected remote control is disposed in proximity to the display device and configured to control display of the media content received from the plurality of Internet content channels. In some implementations, the remote control and the display device are not physically in proximity to each other, and are associated with a user account maintained at a remote server of the smart media environment. Further, the display device can be associated with an Internet-enabled casting device that is also linked to the user account associated with the display and remote control devices, and the casting device is configured to receive the media content from the one or more content channels for the display device.

The Internet-based remote control includes a plurality of user buttons. When the display device displays the media content from the Internet content channels, the plurality of user buttons of the remote control help create first screen experience similar to those available to conventional television devices. The media content received from the Internet media channels is displayed on the display device automatically or with little user intervention when a user activates any of the plurality of user buttons. Stated another way, in response to a user actuation of any of the plurality of user buttons, no remote control interface or a simple remote control interface is displayed on the remote control or the display device, and no or little additional information is displayed for the user to implement a subsequent user actuation of another user button. As such, the display device is configured to display media content from different Internet content channels as a conventional television device displays television channels, thereby allowing surfing through content channels, surfing through programs of a specific channel, previewing subsequent content and reviewing backdrop information related to currently displayed media content.

For example, the Internet-connected remote control includes a quick cast button, a cycle button, a previous/next button, and a preview/backdrop button. While the display device is off and in response to a user actuation on the quick cast button, the remote control controls the display device to immediately play media content provided by a predetermined Internet content channel (e.g., the content channel that was previously played prior to turning of the display device, a specific Internet content channel) as an old-fashioned television does. Further, in some implementations, a user actuation of a preview button or a user actuation of holding down a previous/next button allows the user to peek at upcoming content before committing to watch an associated program provided by the Internet content channel. Similarly, a user actuation of one of the user buttons enables displaying backdrop information (e.g., supporting video) related to the media content currently displayed on the display device (e.g., headline news).

In addition, a user actuation on the cycle button allows prompt switch to a subsequent content channel in a list of predetermined Internet content channels. The simple cycle button allows immediate play of media content, and removes the unnecessary steps in typical cast interaction (e.g. unlock phone >open app >find content >tap cast button >select receiver). More importantly, consecutive user actuations of the cycle button enables swift and sequential launch of media content provided by a list of Internet content channels (e.g., Netflix and YouTube), and allows the user to surf through different Internet content channels to decide what the user is interested in. The user does not need to browse through a complicated remote control interface (e.g., an electronic program guide (EPG)), or select individual receiver applications associated with the different content channels for displaying media content received from the different content channels. The play/cycle button brings a serendipitous TV experience to casting of media content provided by Internet content sources, and enables a familiar paradigm to conventional television experience which allows the user to lean back and enjoy the media content.

Reference will now be made in detail to implementations, examples of which are illustrated in the accompanying drawings. In the following detailed description, numerous specific details are set forth in order to provide a thorough understanding of the various described implementations. However, it will be apparent to one of ordinary skill in the art that the various described implementations may be practiced without these specific details. In other instances, well-known methods, procedures, components, circuits, and networks have not been described in detail so as not to unnecessarily obscure aspects of the implementations.

FIG. 1 is an example smart media display environment 100 in accordance with some implementations. The smart media display environment 100 includes a structure 150 (e.g., a house, office building, garage, or mobile home) with various integrated devices. It will be appreciated that devices may also be integrated into a smart media display environment 100 that does not include an entire structure 150, such as an apartment, condominium, or office space. The depicted structure 150 includes a plurality of rooms 152, separated at least partly from each other via walls 154. The walls 154 may include interior walls or exterior walls. Each room may further include a floor 156 and a ceiling 158.

One or more media device is disposed in the smart media display environment 100 to provide media content that is stored at a local content source or streamed from a remote content source. The media devices can be classified to two categories: display devices 106 that directly output the media content to audience, and casting devices 108 that streams media content to the display devices 106. Examples of the display devices 106 include, but are not limited to television (TV) display devices and music players. Examples of the casting devices 108 include, but are not limited to, a set-top boxes (STBs), DVD players and TV boxes. In the example smart media display environment 100, the display devices 106 are disposed in more than one location, and each display device 106 is coupled to a respective casting device 108 or includes an embedded casting unit. The display device 106-1 includes a TV display that is hard wired to a DVD player or a set top box 108-1. The display device 106-2 includes a smart TV device that integrates an embedded casting unit to stream media content for display to its audience. The display device 106-3 includes a regular TV display that is coupled to a TV box 108-3 (e.g., Google TV or Apple TV products), and such a TV box 108-3 streams media content received from a media content and provides an access to the Internet for displaying Internet-based content on the display device 106-3.

In various implementations of this application, an Internet-connected remote control device 190 having a plurality of user buttons is used in the smart media display environment 100 to control reviewing Internet content channels on an Internet-connected display device 106. The remote control device and the display device 106 are associated with a first user account maintained at a server (e.g., the smart media display server system 140). Optionally, the remote control device 190 is disposed in proximity to the display device 106 and configured to control display of media content received from a plurality of content channels (e.g., Internet content servers 114) on the display device 106. In some implementations, given that both the remote control device 190 and the display device 106 are also associated via the server system 140, the remote control device 190 and the display device 106 are not disposed in proximity to each other. Further, in some implementations, the display device 106 is associated with an Internet-enabled casting device 104 configured to receive the media content from the one or more Internet content channels. Stated another way, the remote control device 190 and the casting device 104 are associated with the first user account maintained at the server system 140.

When the display device 106 displays the media content received from the Internet content channels, the plurality of buttons of the remote control creates first screen experience similar to those available to conventional television devices without involving a complicated remote control interface that is displayed on the display or remote control devices and demands user intervention. In a specific example, the remote control device 190 includes a quick cast button that allows immediate play of media content provided by one of the Internet content channels, a cycle button that sequentially launches content associated with a list of selected/preferred content channels (e.g., Netflix and YouTube), and a previous/next button that allows forwarding and rewinding among different programs in a specific channel. In some implementations, the remote control includes a dedicated button for previewing upcoming content associated with a program that is currently displayed on the display device or displaying backdrop information related to the media content currently displayed on the display device. Alternatively, the remote control configures an existing button (e.g., by requiring an extended button holding time) to trigger any of the above media control functions for the display device.

The smart home devices in the smart media display environment 100 may include, but are not limited to, one or more intelligent, multi-sensing, network-connected thermostats 122, one or more intelligent, network-connected, multi-sensing hazard detectors 124, one or more intelligent, multi-sensing, network-connected entryway interface devices 126 and 128 (hereinafter referred to as "smart doorbells 126" and "smart door locks 128"), one or more intelligent, multi-sensing, network-connected alarm systems 130, one or more intelligent, multi-sensing, network-connected camera systems 132, one or more intelligent, multi-sensing, network-connected microphone devices 134, one or more intelligent, multi-sensing, network-connected wall switches 136, and one or more intelligent, multi-sensing, network-connected wall plug interfaces 142. In some implementations, the smart home devices in the smart media display environment 100 of FIG. 1 includes a plurality of intelligent, multi-sensing, network-connected appliances 138 (hereinafter referred to as "smart appliances 138"), such as refrigerators, stoves, ovens, televisions, washers, dryers, lights, stereos, intercom systems, garage-door openers, floor fans, ceiling fans, wall air conditioners, pool heaters, irrigation systems, security systems, space heaters, window AC units, motorized duct vents, and so forth.

The smart home devices in the smart media display environment 100 may additionally or alternatively include one or more occupancy sensors (e.g., touch screens, IR sensors, ambient light sensors and motion detectors). In some implementations, the smart home devices in the smart media display environment 100 include radio-frequency identification (RFID) readers (e.g., in each room 152 or a portion thereof) that determine occupancy based on RFID tags located on or embedded in occupants. For example, RFID readers may be integrated into the smart hazard detectors 104.

In some implementations, in addition to containing sensing capabilities, devices 122, 124, 126, 128, 130, 132, 134, 136 and 138 (which are collectively referred to as "the smart home devices" or "the smart home devices 120") are capable of data communications and information sharing with other smart home devices, a central server or cloud-computing system, and/or other devices (e.g., the client device 104, the display devices 106, the casting devices 108 and the remote control devices 190) that are network-connected. Similarly, the casting devices 108 and the remote control devices 190 are capable of data communications and information sharing with the smart home devices, a central server or cloud-computing system, and/or other devices (e.g., the client device 104 and the other casting devices 108) that are network-connected. Data communications may be carried out using any of a variety of custom or standard wireless protocols (e.g., IEEE 802.15.4, Wi-Fi, ZigBee, 6LoWPAN, Thread, Z-Wave, Bluetooth Smart, ISA100.11a, WirelessHART, MiWi, etc.) and/or any of a variety of custom or standard wired protocols (e.g., Ethernet, HomePlug, etc.), or any other suitable communication protocol, including communication protocols not yet developed as of the filing date of this document.

In some implementations, the display devices 106, the casting devices 108, the remote control devices 190 and the smart home devices serve as wireless or wired repeaters. In some implementations, a first one of the display devices 106, the casting devices 108, the remote control devices 190 and the smart home devices communicates with a second one of these aforementioned devices directly via a wireless router. The display devices 106, the casting devices 108, the remote control devices 190 and the smart home devices may further communicate with each other via a connection (e.g., network interface 160) to a network, such as the Internet 112. Through the Internet 112, the display devices 106, the casting devices 108, the remote control devices 190 and the smart home devices may communicate with a smart media display server system 140 (also called a central server system and/or a cloud-computing system herein). Optionally, the smart media display server system 140 may be associated with a manufacturer, support entity, or service provider associated with the casting devices 108 and the media content displayed to the user. Accordingly, the smart media display server system 140 may include one or more content servers 104 that provide the displayed media content, and a cast device host 116 that manages the display devices 106, the casting devices 108, the remote control devices 190 and the smart home devices associated with different user accounts. In some implementations, the cast device host 116 further stores a device register that storing information of one or more user accounts and information of user devices associated with each of the one or more user accounts.

In an example, an Internet-connected remote control device 190 is coupled via a short-range communication link (e.g., a Bluetooth communication link) to a display device 106, a casting device 180 or a smart home device that are associated with the remote control device 190 via a user account managed by the cast device host 116. The display, casting or smart home device is further communicatively coupled to the server system 140 via the Internet and other wide area, local area or metropolitan area networks that are established based on the network interface 160. In another example, the Internet-connected remote control device 190 is coupled to the server system 140 and other display, casting or smart home devices via the Internet and other wide area, local area or metropolitan area networks that are established based on the network interface 160.

In some implementations, the network interface 160 includes a conventional network device (e.g., a router). The smart media display environment 100 of FIG. 1 further includes a hub device 180 that is communicatively coupled to the network(s) 112 directly or via the network interface 160. The hub device 180 is further communicatively coupled to one or more of the above intelligent, multi-sensing, network-connected devices (e.g., smart home devices of the smart media display environment 100, the casting devices 108 and the client device 104). Each of these network-connected devices optionally communicates with the hub device 180 using one or more radio communication networks available at least in the smart media display environment 100 (e.g., ZigBee, Z-Wave, Insteon, Bluetooth, Wi-Fi and other radio communication networks). In some implementations, the hub device 180 and devices coupled with/to the hub device can be controlled and/or interacted with via an application running on a smart phone, household controller, laptop, tablet computer, game console or similar electronic device. In some implementations, a user of such controller application can view status of the hub device or coupled network-connected devices, configure the hub device to interoperate with devices newly introduced to the home network, commission new devices, and adjust or view settings of connected devices, etc.

Figure 2:
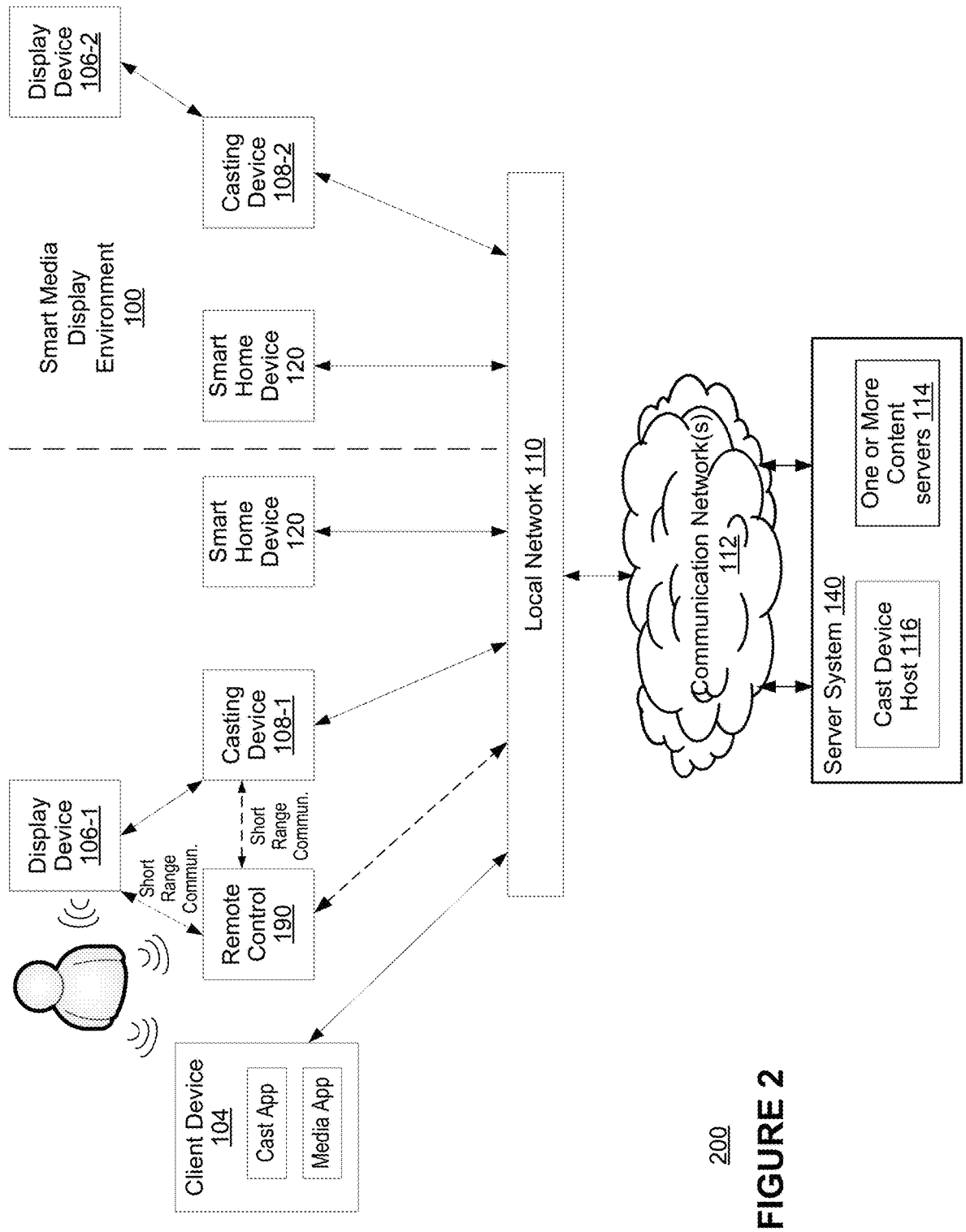
FIG. 2 is an example operating environment in which a remote control device interacts with display devices and a server system of a smart media display environment in accordance with some implementations.

FIG. 2 is an example operating environment 200 in which a remote control device 190 interacts with display devices 106 and a server system 140 of a smart media display environment 100 in accordance with some implementations. The remote control device 190 and the display devices 106 are associated with a first user account maintained at the server system 140 (e.g., a cast device host 116). The smart media display environment 100 includes one or more locations, e.g., location A and location B. The user 102 is located at location A or B, and could move freely between these two locations. A display device 106 are disposed at each of the one or more locations in the display environment 100, and optionally communicated to a casting device 108 via wired or wireless communication available therein. The respective displays 106 are configured to obtain Internet content directly or indirectly via the respective casting devices 108 for display on the display devices 106 under the control of the remote control device 190. In various embodiments of this application, the remote control device 190 includes a plurality of user buttons, and is configured to control reviewing of media content provided by Internet content channels on the display devices 106. In some implementations (e.g., at location A), the remote control device 190 is disposed in proximity to the display device 106-1 or the casting device 108-1, and includes one or more radios, e.g., a first radio that supports a short-range communication link with the display or casting device and a second radio that supports communication via with a local area network 110. Alternatively, in some implementations (e.g., at location B), the display device 106-2 and the casting device 108-2 are not disposed in proximity to the remote control device 190, and however, the remote control device 190 can still communicate with the display device 106-2 or the casting device 108-2 via the second radio and the associated local area network 110 to control reviewing of Internet content on the display device 106-2.

In some implementations, the remote control device 190 includes one or more processors and memory storing instructions for execution by the one or more processors, and therefore, media control operations are initiated and partially implemented by the remote control device 190. For example, the remote control device 190 receives a user actuation of a first user button (e.g., a cycle button), and then identifies a first Internet content channel that is currently being displayed on the display device. The remote control device 190 obtains a preferred channel list that includes a sequence of Internet content channels that is associated with the first user account and arranged according to a predetermined channel order. The sequence of Internet content channels includes the first Internet content channel. Media content of each Internet content channel is provided via the Internet by one of the one or more content servers 114. In accordance with the preferred channel list, the remote control device 190 identifies a second Internet content channel that follows the first Internet content channel in the preferred channel list, and transmits to the server system 140 a first channel change message including information of the second Internet content channel to cause the Internet-connected display device 106 to display media content provided by the second content channel. Further, in some implementations, when the user consecutively actuates the first user button, media content received from the sequence of Internet content channel are sequentially displayed on the display device 106, thereby enabling channel surfing experience for the user.

Alternatively, in some implementations, media control operations are initiated on the remote control device 190, but are partially implemented by the casting device 108 or the server system 140 that is communicatively coupled to the display device 106. The remote control device 190 receives a user actuation on the first user button, and the casting device 108 or the server system 140 identifies a first Internet content channel that is currently being displayed on the display device 106. The casting device 108 or the server system 140 obtains a preferred channel list that includes a sequence of Internet content channels that is associated with the first user account and arranged according to a predetermined channel order. The sequence of Internet content channels includes the first Internet content channel. Media content of each Internet content channel is provided via the Internet by one of the one or more content servers 114. In accordance with the preferred channel list, the casting device 108 or the server system 140 identifies a second Internet content channel that follows the first Internet content channel in the preferred channel list. In some implementations, after identifying the second Internet content channel, the server system 140 sends a first channel change message including information of the second content channel to the display or casting device to cause the Internet-connected display device 106 to display media content provided by the second content channel. Alternatively, in some implementations, after identifying the second Internet content channel or receiving information of the second Internet content channel, the casting device 108 causes the display device 106 to display media content provided by the second content channel. It is noted that in some implementations, the casting device 108 is embedded within and forms integral part of the display device 106.

In some implementations, the user is associated with a client device 104 that is installed with a cast device application configured to manage the remote control device 190, media play devices and smart home devices linked to the first user account. Specifically, the cast device application includes a user interface on which the user may log onto the first user account and select a plurality of Internet content channels and arrange them according to a predetermined channel order. The predetermined channel order of the preferred channel list is therefore customized for the first user account, and the first and second Internet content channels are two consecutive programs in the sequence of Internet content channels. When such channel surfing reaches the end of the preferred channel list, a subsequent user actuation on the first user button controls the display device 104 to move to a subsequent channel from the start of the preferred channel list. Stated another way, the sequence of Internet content channels starts with the second Internet content channel and ends with the first Internet content channel.

The media control operations initiated by the remote control device 190 further includes switching through a sequence of programs of a specific Internet content channel (e.g. YouTube) in addition to switching through the sequence of Internet content channels. The remote control device 190 further includes a previous button and a next button that are distinct from each other and from the first user button. When the specific Internet content channel is activated for display on the display device 106, media content associated with a first program (e.g., a first music video clip) of the sequence of programs is displayed on the Internet-connected display device 106. In response to a user actuation on the previous or next button, the remote control device 190 generates a program scan request to request display of a second program provided by the specific Internet content channel. Information of the second program is determined by one of the Internet-enabled casting device 108, the server 102 and a content server 114 of the specific Internet content channel based on a preferred program list associated with the specific Internet content channel and information of the first program. When the user repeatedly actuates the previous or next button, media content received from the sequence of programs are sequentially displayed on the display device 106 according to the preferred program list, thereby enabling program surfing experience associated with the specific Internet content channel for the user.

The media control operations initiated by the remote control device 190 further includes previewing media content received from a specific Internet content channel. The remote control device 190 further includes a plurality of user buttons. When the specific Internet content channel is activated for display on the display device 106, media content associated with a specific program (e.g., a movie clip that lasts for more than one hour) is displayed on the Internet-connected display device 106. In response to a user actuation on one of the plurality of user buttons (e.g., a press on a second user button or an extended hold of the first user button), the remote control device 190 generates a program preview request for displaying a set of subsequent media frames (also called preview frames) related to the specific program. The Internet-enabled casting device 108 coupled to the display device 106 is configured to enable a preview window for displaying the set of subsequent media frames on the display device 106, and the preview window is overlaid on the media content displayed on the display device.

Further, the media control operations initiated by the remote control device 190 further includes reviewing backdrop information related to currently displayed media content received from a specific Internet content channel. When the specific Internet content channel is activated for display on the display device 106, media content associated with a specific program (e.g., a news clip) is displayed on the Internet-connected display device 106. In response to a user actuation of one of the plurality of user buttons (e.g., a press on a third user button or an extended hold of the first user button), the remote control device 190 generates a backdrop review request for displaying one or more media items related to the first program. The server system 140 is configured to in response to the backdrop review request, obtain information of the one or more media items and provide the information of the one or more media items to the display device 106 directly or indirectly via the casting device 108. In some implementations, the Internet-based casting device is 108 configured to enable display of information of the one or more media items on the display device 106, and in response to a selection of one of the one or more media items by a viewer, enable display of media content corresponding to the selected one of the one or more media items on the display device 106.

The aforementioned media control operations initiated by the remote control device 190 involve neither use of a client device 104 (e.g., a mobile phone) nor display of a complicated remote control interface on the display device 106 or the remote control device 190 itself. These media control operations allow a user to use the remote control device 190 to enjoy first-screen navigations among a sequence of Internet content channels, among a sequence of programs of each Internet content channel and within each individual program, although these Internet content channels are associated with different media content providers and media content provided by these Internet content channels is provided from different content servers 114.

Figure 3B:
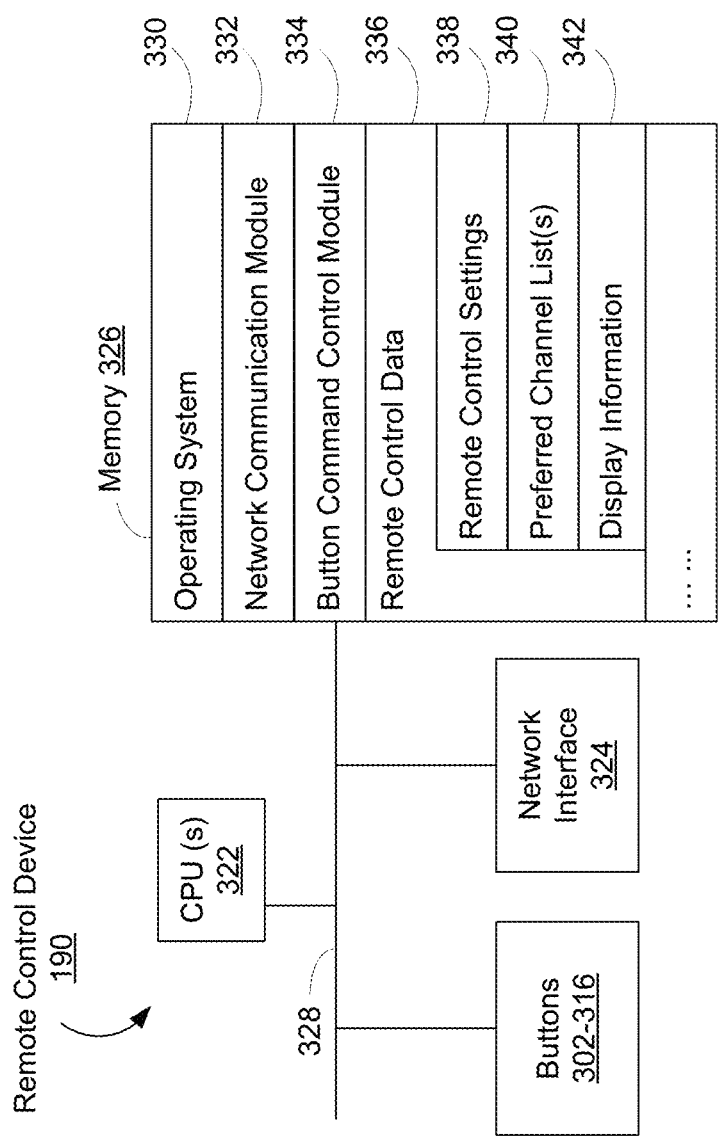
FIG. 3B is a block diagram illustrating the remote control device shown in FIG. 3A in accordance with some implementations.
Figure 3A:
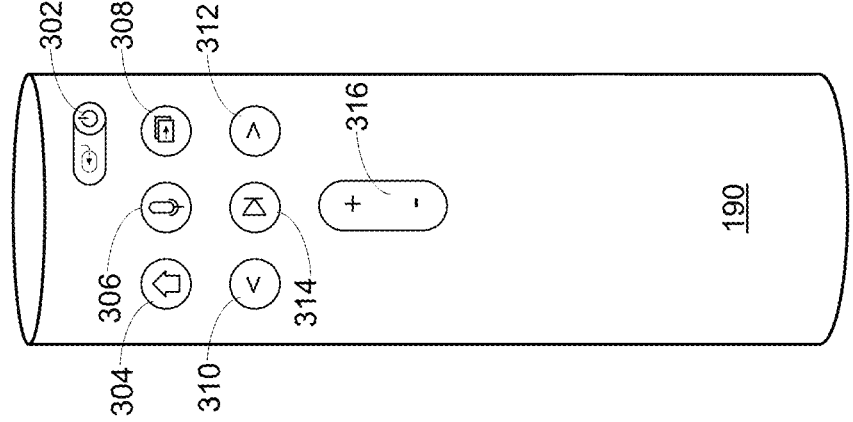
FIG. 3A is an example Internet-connected remote control device that includes a plurality of user buttons and is configured to control reviewing media content on an Internet-connected display device in a smart media display environment in accordance with some implementations.

FIG. 3A is an example Internet-connected remote control device 190 that includes a plurality of user buttons and is configured to control reviewing media content on an Internet-connected display device 106 in a smart media display environment 100 in accordance with some implementations. FIG. 3B is a block diagram illustrating the remote control device 190 shown in FIG. 3A in accordance with some implementations. The plurality of user buttons of the remote control device 190 includes one or more of a power button 302, a home button 304, a microphone button 306, a cycle button 308 (also called a play/cycle button), a previous button 310, a next button 312, a preview/backdrop button 314 and a volume control button 316. A user actuation on the power button 302 powers on the display device 106 coupled to the remote control device 190 when the display device 106 is off prior to the user actuation, and powers off the display device 106 when the display device 106 is on prior to the user actuation. A user actuation on the home button 304 controls the display device 106 to display a home screen. For example, the home screen displays a specific advertisement clip or a randomly selected media program provided by a predetermined Internet content channel. In some implementations, the power button 302 or the home button 304 functions as a quick cast button configured to enable immediate play of media content provided by a specific Internet content channel. Further, a user actuation on the microphone button 306 controls a speaker integrated in the remote control device 190 to collect sound signals in the smart media display environment 100, and voice commands are extracted from the sound signals to control the smart home and media play devices located in the smart media display environment 100.

In some implementations, a user actuation on the cycle button 308 launches media content of an Internet content channel in a list of selected/preferred content channels (e.g., Netflix, Pandora, ESPN and YouTube), and consecutive user actuations of the cycle button 308 allow a user to browse through all Internet content channels in the preferred channel list. Similarly, in some implementations, a user actuation on the previous button 310 launches media content of a media program in a preferred program list of a specific Internet content channel (e.g., Netflix), and consecutive user actuations of the previous button 310 allow a user to browse through at least part (if not all) of media programs in the preferred program list. Similar media display control is made possible by one or more user actuation on the next button 312, except that the user actuations of the previous and next buttons result in opposite orders of reviewing the media programs in the preferred program list of the specific Internet content channel.

In some implementations, the remote control device 190 includes a dedicated button (e.g., the preview/backdrop button 314) for previewing upcoming content associated with a program that is currently displayed on the display device 106 or displaying backdrop information related to the media content currently displayed on the display device 106. Alternatively, in some implementations, the remote control device 190 configures an existing button (e.g., by requiring an extended button holding time on the cycle button 308) to trigger the media control function of content previewing or backdrop reviewing.

Referring to FIG. 3B, the remote control device 190, typically, includes one or more processing units (CPUs) 322, one or more network interfaces 324, memory 326, and one or more communication buses 328 for interconnecting these components (sometimes called a chipset). The remote control device 190 includes one or more input devices that facilitate user input, such as the plurality of user buttons 302-316 and a voice-command input unit or microphone. In some implementations, the remote control device 190 also includes one or more output devices that enable presentation of user interfaces and display content, including one or more speakers and/or one or more visual displays. Memory 326 includes high-speed random access memory, such as DRAM, SRAM, DDR RAM, or other random access solid state memory devices; and, optionally, includes non-volatile memory, such as one or more magnetic disk storage devices, one or more optical disk storage devices, one or more flash memory devices, or one or more other non-volatile solid state storage devices. Memory 326, optionally, includes one or more storage devices remotely located from one or more processing units 322. Memory 326, or alternatively the non-volatile memory within memory 326, includes a non-transitory computer readable storage medium. In some implementations, memory 326, or the non-transitory computer readable storage medium of memory 326, stores the following programs, modules, and data structures, or a subset or superset thereof:

Operating system 330 including procedures for handling various basic system services and for performing hardware dependent tasks;

Network communication module 332 for connecting the remote control device 190 to other devices (e.g., the server system 140, the display device 106, the casting device 108, the smart home devices 120 and the client device 104) via one or more network interfaces 160 (wired or wireless) and one or more networks 112, such as the Internet, other wide area networks, local area networks, metropolitan area networks, and so on;

Button command control module 334 for controlling media content display on a display device coupled to the remote control device 190 in response to a user actuation on each of the user buttons 302-316 (e.g., implementing each of the media control functions including, but not limited to, switching Internet content channels according to a preferred channel list, switching programs of an Internet content channel according to a preferred program list, previewing media content of a currently display media program and reviewing backdrop information related to currently displayed media content);

Remote control data 336 storing at least data associated with control of media display on the display device 106 coupled to the remote control device 190, including:
Remote control settings 338 for storing information associated with the remote control device 190 itself, including common device settings (e.g., service tier, device model, storage capacity, processing capabilities, communication capabilities, etc.), media control functions linked to individual buttons, commands and data for implementing each of the media content functions, and information of one or more user accounts with which the remote control device is associated;
One or more preferred channel lists 340 for identifying a subsequent Internet content channel that is displayed on the display device 106 coupled to the remote control device 190 in response to a user actuation on the cycle button (or a predetermined user button), where in some implementations, each preferred channel list 340 is associated with a user account managed by the server system 140; and
Display information 342 for storing information associated with media content currently displayed on the display device, including but not limited to, one or more of information of an Internet content channel that provides currently displayed media content, a media program of the content channel that is currently displayed, and preferred program lists for one or more Internet content channels.

Figure 4:
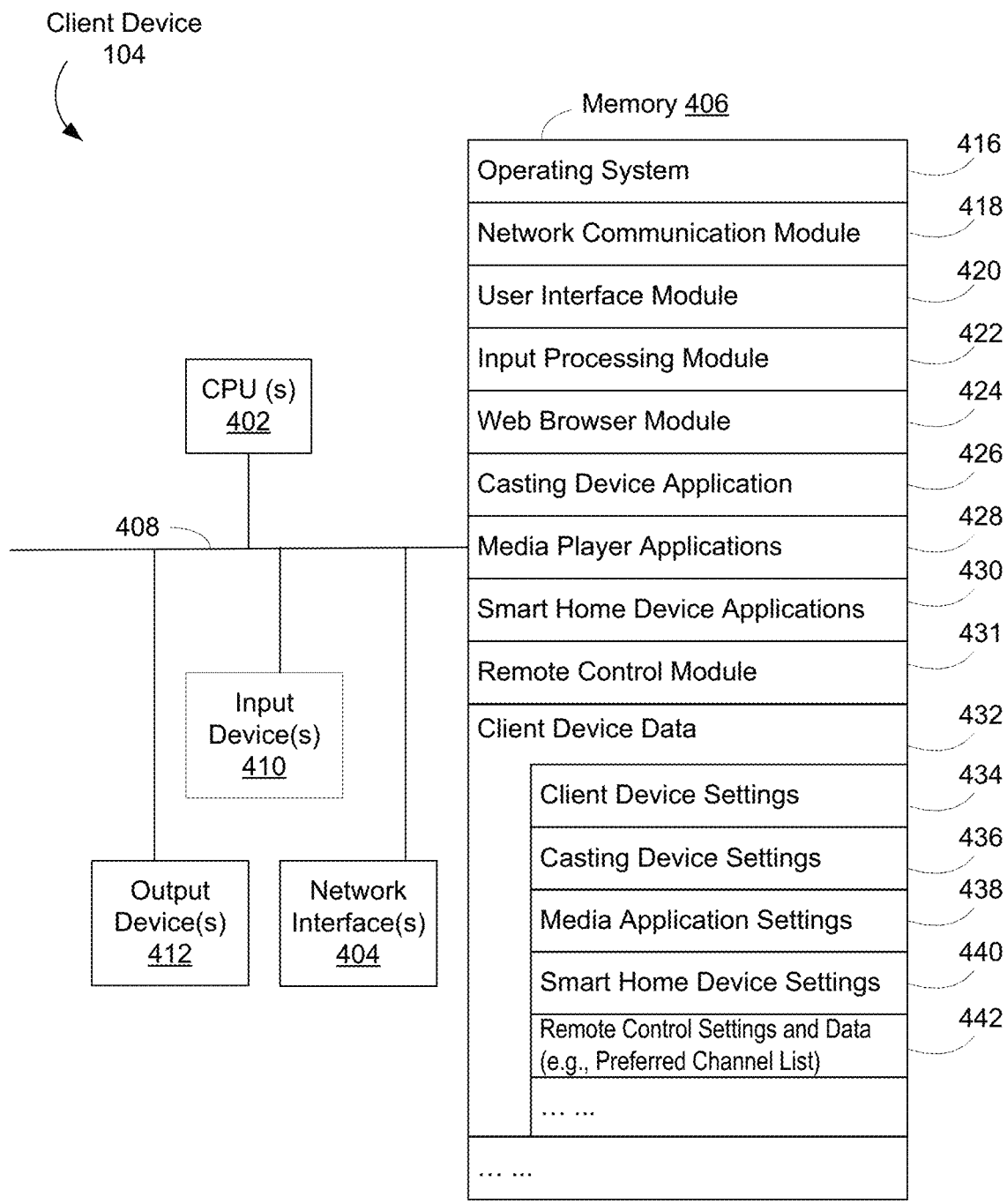
FIG. 4 is a block diagram illustrating an example client device that is applied for controlling media devices, smart home devices and remote control devices in a smart media display environment in accordance with some implementations.

FIG. 4 is a block diagram illustrating an example client device 104 that is applied for controlling media devices, smart home devices and remote control devices in a smart media display environment 100 in accordance with some implementations. Examples of the client device include, but are not limited to, a mobile phone, a tablet computer and a wearable personal device. The client device 104, typically, includes one or more processing units (CPUs) 402, one or more network interfaces 404, memory 406, and one or more communication buses 408 for interconnecting these components (sometimes called a chipset). The client device 104 includes one or more input devices 410 that facilitate user input, such as a keyboard, a mouse, a voice-command input unit or microphone, a touch screen display, a touch-sensitive input pad, a gesture capturing camera, or other input buttons or controls. Furthermore, some the client devices 104 use a microphone and voice recognition or a camera and gesture recognition to supplement or replace the keyboard. In some implementations, the client device 104 includes one or more cameras, scanners, or photo sensor units for capturing images, for example, of graphic series codes printed on the electronic devices. The client device 104 also includes one or more output devices 412 that enable presentation of user interfaces and display content, including one or more speakers and/or one or more visual displays.

Memory 406 includes high-speed random access memory, such as DRAM, SRAM, DDR RAM, or other random access solid state memory devices; and, optionally, includes non-volatile memory, such as one or more magnetic disk storage devices, one or more optical disk storage devices, one or more flash memory devices, or one or more other non-volatile solid state storage devices. Memory 406, optionally, includes one or more storage devices remotely located from one or more processing units 402. Memory 406, or alternatively the non-volatile memory within memory 406, includes a non-transitory computer readable storage medium. In some implementations, memory 406, or the non-transitory computer readable storage medium of memory 406, stores the following programs, modules, and data structures, or a subset or superset thereof:

Operating system 416 including procedures for handling various basic system services and for performing hardware dependent tasks;

Network communication module 418 for connecting the client device 104 to other devices (e.g., the server system 140, the display device 106, the casting device 108, the smart home devices 120, the remote control devices 190 and the other client devices 104) via one or more network interfaces 404 (wired or wireless) and one or more networks 112, such as the Internet, other wide area networks, local area networks, metropolitan area networks, and so on;

User interface module 420 for enabling presentation of information (e.g., a graphical user interface for presenting application(s) 426-430, widgets, websites and web pages thereof, and/or games, audio and/or video content, text, etc.) at the client device 104 via one or more output devices 412 (e.g., displays, speakers, etc.);

Input processing module 422 for detecting one or more user inputs or interactions from one of the one or more input devices 410 and interpreting the detected input or interaction;

Web browser module 424 for navigating, requesting (e.g., via HTTP), and displaying websites and web pages thereof, including a web interface for logging into a user account associated with a casting device 108, a media application, a smart home device 120 or a remote control device 190, controlling the casting device 108 or the smart home device 120 if associated with the user account, and editing and reviewing settings and data that are associated with the user account;

One or more applications for execution by the client device (e.g., games, social network applications, smart home applications, and/or other web or non-web based applications for controlling the casting devices 108, the remote control device 190 and/or the smart home devices 120 and reviewing data/settings associated with such devices), including one or more of:

a casting device application 426 that is executed to provide client-side functionalities for device provisioning, device control, and user account management associated with casting device(s) 108;

one or more media player applications 428 that is executed to provide client-side functionalities for media display and user account management associated with corresponding media sources;

one or more smart home device applications 430 that are executed to provide client-side functionalities for device provisioning, device control, data processing and data reviewing of corresponding smart home devices 120; and one or more remote control modules 431 that are executed to provide client-side functionalities for device provisioning, device control and data processing of corresponding remote control devices 190; and client device data 432 storing at least data associated with control of media display on the display device 106 coupled to the remote control device 190, including:

Client device settings 434 for storing information associated with the client device 104 itself, including common device settings (e.g., service tier, device model, storage capacity, processing capabilities, communication capabilities, etc.), and information for automatic media display control;

Casting device settings 436 for storing information associated with user accounts of the casting device application 426, including one or more of account access information, information for device settings (e.g., service tier, device model, storage capacity, processing capabilities, communication capabilities, etc.), and information for media display control;

Media player application settings 438 for storing information associated with user accounts of one or more media player applications 428, including one or more of account access information, user preferences of media content types, review history data, and information for media display control;

Smart home device settings 440 for storing information associated with user accounts of the smart home applications 430, including one or more of account access information, information for smart home device settings (e.g., service tier, device model, storage capacity, processing capabilities, communication capabilities, etc.); and Remote control settings 442 for storing information associated with one or more remote control devices 190, including but not limited to, one or more of common device settings (e.g., service tier, device model, storage capacity, processing capabilities, communication capabilities, etc.), media control functions linked to individual buttons, commands and data for implementing each of the media content functions, information of one or more user accounts with which the remote control device is associated, one or more preferred channel lists for identifying a sequence of Internet content channels, and display information associated with media content currently displayed on the display devices 106 coupled to the one or more remote control devices 190.

In some implementations, each of the casting device application 426, the media player applications 428, the smart home device applications 430 and the remote control module 431 causes display of a respective user interface on the output device 412 of the client device 104. For example, a user interface of a remote control module 431 could display a notification indicating that change of an Internet content channel or a media program that is currently displayed on a display device coupled to a corresponding remote control device. The user interface of the remote control module 431 could also prompt a user to create or change a preferred channel list associated with a user account. More details on the aforementioned user interfaces are discussed below with reference to FIG. 7.

Each of the above identified elements may be stored in one or more of the previously mentioned memory devices, and corresponds to a set of instructions for performing a function described above. The above identified modules or programs (i.e., sets of instructions) need not be implemented as separate software programs, procedures, modules or data structures, and thus various subsets of these modules may be combined or otherwise re-arranged in various implementations. In some implementations, memory 406, optionally, stores a subset of the modules and data structures identified above. Furthermore, memory 406, optionally, stores additional modules and data structures not described above.

Figure 5:
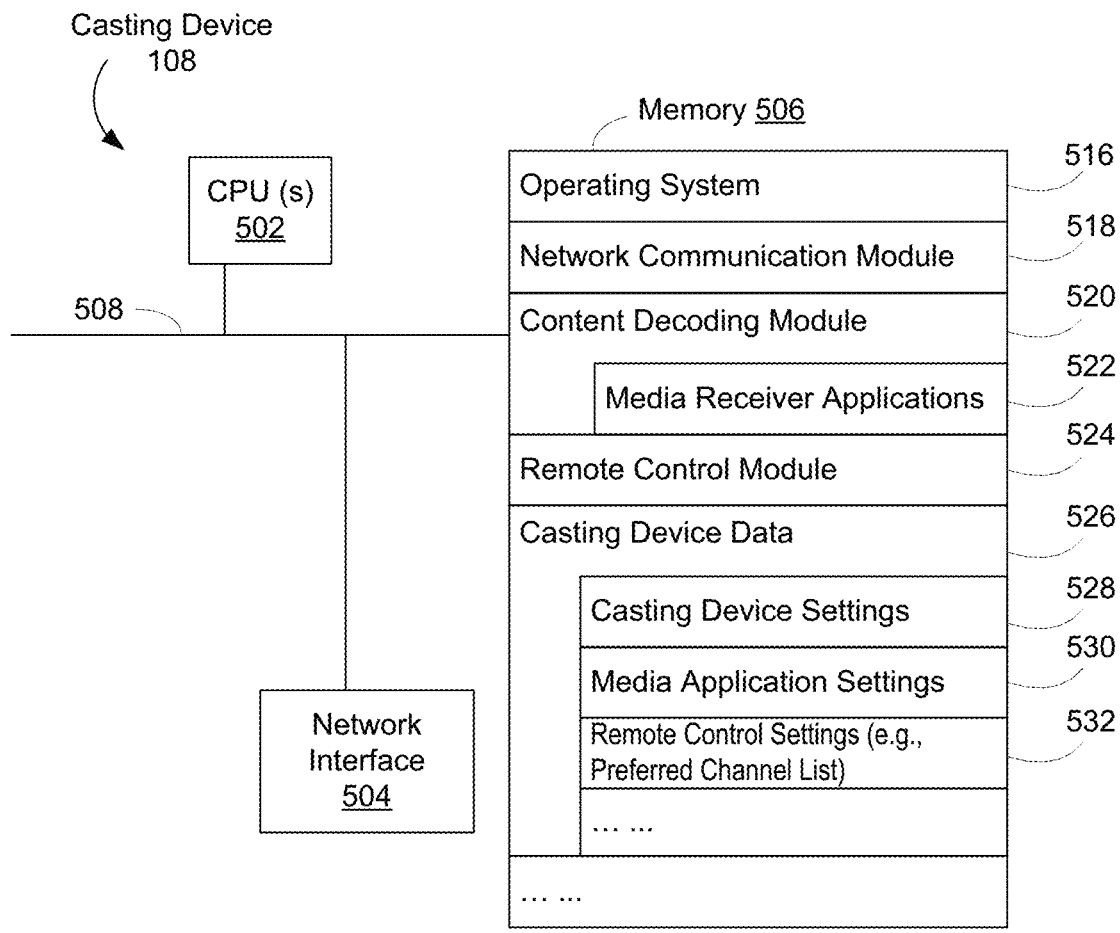
FIG. 5 is a block diagram illustrating an example casting device applied for control of display of media content on a display device in a smart media display environment in accordance with some implementations.

FIG. 5 is a block diagram illustrating an example casting device 108 applied for control of display of media content on a display device 106 in a smart media display environment 100 in accordance with some implementations. The casting device 108, typically, includes one or more processing units (CPUs) 502, one or more network interfaces 504, memory 506, and one or more communication buses 508 for interconnecting these components (sometimes called a chipset). Memory 506 includes high-speed random access memory, such as DRAM, SRAM, DDR RAM, or other random access solid state memory devices; and, optionally, includes non-volatile memory, such as one or more magnetic disk storage devices, one or more optical disk storage devices, one or more flash memory devices, or one or more other non-volatile solid state storage devices. Memory 506, optionally, includes one or more storage devices remotely located from one or more processing units 502. Memory 506, or alternatively the non-volatile memory within memory 506, includes a non-transitory computer readable storage medium. In some implementations, memory 506, or the non-transitory computer readable storage medium of memory 506, stores the following programs, modules, and data structures, or a subset or superset thereof:

- Operating system 516 including procedures for handling various basic system services and for performing hardware dependent tasks;
- Network communication module 518 for connecting the casting device 108 to other computers or systems (e.g., the server system 140, the smart home devices 120 and the client device 104) via one or more network interfaces 504 (wired or wireless) and one or more networks 112, such as the Internet, other wide area networks, local area networks, metropolitan area networks, cable television systems, satellite television systems, IPTV systems, and so on;
- Content Decoding Module 520 for decoding content signals received from one or more content servers 114 and outputting the content in the decoded signals to a display device 106 coupled to the casting device 108, wherein the content decoding module 520 includes one or more media receiver applications 522 loaded locally at the casting device 108 for enabling display of media content provided by the Internet content channels associated with the Internet content servers 114 on the display device 106;
- Remote control module 524 for determining the proximity of the client device 104 based on proximity related information that is detected by the proximity detection unit 515 or provided by the server system 140;
- Casting device data 526 storing at least data associated with control of media display on the display device 106, including:
  - Casting device settings 528 for storing information associated with user accounts of a casting device application, including one or more of account access information, information for device settings (e.g., service tier, device model, storage capacity, processing capabilities, communication capabilities, etc.), and information for automatic media display control;
  - Media player application settings 530 for storing information associated with user accounts of one or more media receiver applications 522, including one or more of account access information, user preferences of media content types, review history data, and preferred program lists for Internet content channels corresponding to the media receiver applications 522; and
  - Remote control settings 532 for storing information associated with one or more remote control devices 190, including but not limited to, one or more of common device settings (e.g., service tier, device model, storage capacity, processing capabilities, communication capabilities, etc.), media control functions linked to individual buttons, commands and data for implementing each of the media content functions, information of one or more user accounts with which the remote control device is associated, one or more preferred channel lists for identifying a sequence of Internet content channels, and display information associated with media content currently displayed on the display devices 106 coupled to the one or more remote control devices 190.

Each of the above identified elements may be stored in one or more of the previously mentioned memory devices, and corresponds to a set of instructions for performing a function described above. The above identified modules or programs (i.e., sets of instructions) need not be implemented as separate software programs, procedures, modules or data structures, and thus various subsets of these modules may be combined or otherwise re-arranged in various implementations. In some implementations, memory 506, optionally, stores a subset of the modules and data structures identified above. Furthermore, memory 506, optionally, stores additional modules and data structures not described above.

Figures 6A, 6B:
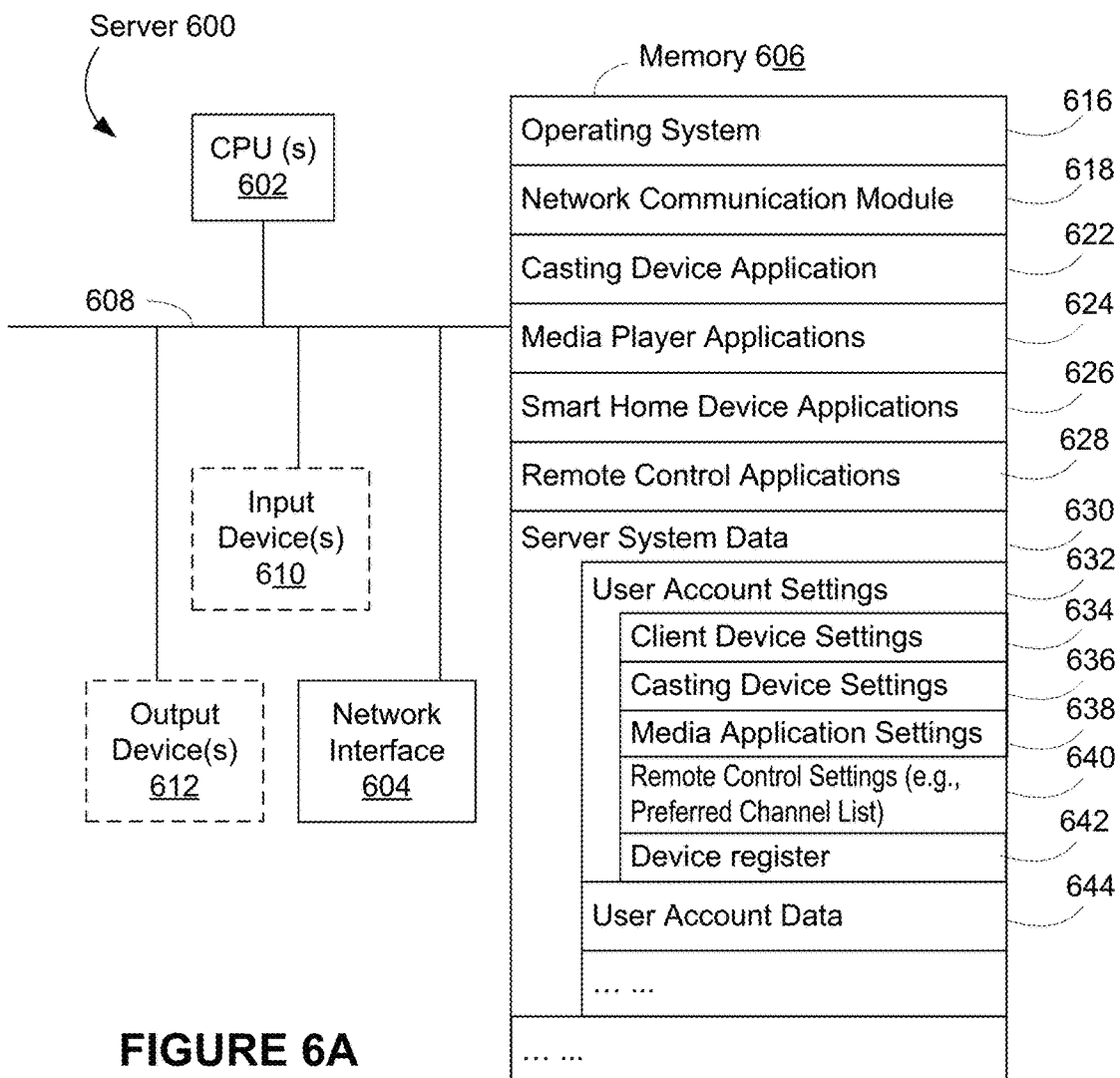
FIG. 6A is a block diagram illustrating a server (e.g., a cast device host) of a smart media display environment in accordance with some implementations.
FIG. 6B is an example device register of a server that stores information of one or more user accounts managed by the server system and information of user devices associated with each of the one or more user accounts in accordance with some implementations.

FIG. 6A is a block diagram illustrating a server 600 (e.g., a cast device host 116) of a smart media display environment 100 in accordance with some implementations. The server 600, typically, includes one or more processing units (CPUs) 602, one or more network interfaces 604, memory 606, and one or more communication buses 608 for interconnecting these components (sometimes called a chipset). The server 600 could include one or more input devices 610 that facilitate user input, such as a keyboard, a mouse, a voice-command input unit or microphone, a touch screen display, a touch-sensitive input pad, a gesture capturing camera, or other input buttons or controls. Furthermore, the server 600 could use a microphone and voice recognition or a camera and gesture recognition to supplement or replace the keyboard. In some implementations, the server 600 includes one or more cameras, scanners, or photo sensor units for capturing images, for example, of graphic series codes printed on the electronic devices. The server 600 could also include one or more output devices 612 that enable presentation of user interfaces and display content, including one or more speakers and/or one or more visual displays.

Memory 606 includes high-speed random access memory, such as DRAM, SRAM, DDR RAM, or other random access solid state memory devices; and, optionally, includes non-volatile memory, such as one or more magnetic disk storage devices, one or more optical disk storage devices, one or more flash memory devices, or one or more other non-volatile solid state storage devices. Memory 606, optionally, includes one or more storage devices remotely located from one or more processing units 602. Memory 606, or alternatively the non-volatile memory within memory 606, includes a non-transitory computer readable storage medium. In some implementations, memory 606, or the non-transitory computer readable storage medium of memory 606, stores the following programs, modules, and data structures, or a subset or superset thereof:

- Operating system 616 including procedures for handling various basic system services and for performing hardware dependent tasks;
- Network communication module 618 for connecting the server system 140 to other devices (e.g., various servers in the server system 140, the client device 104, the casting device 108, and the smart home devices 120) via one or more network interfaces 604 (wired or wireless) and one or more networks 112, such as the Internet, other wide area networks, local area networks, metropolitan area networks, and so on;

One or more applications for execution on the server side (e.g., games, social network applications, smart home applications, and/or other web or non-web based applications for controlling the client device 104, the casting devices 108, the smart home devices 120 and the remote control device 190 and reviewing data associated with such devices), including one or more of:

a casting device application 622 that is executed to provide server-side functionalities for device provisioning, device control, and user account management associated with casting device(s) 108;

one or more media player applications 624 that is executed to provide server-side functionalities for media display and user account management associated with corresponding media sources;

one or more smart home device applications 626 that is executed to provide server-side functionalities for device provisioning, device control, data processing and data review of corresponding smart home devices 120; and one or more remote control modules 628 that are executed to provide server-side functionalities for device provisioning, device control and data processing of corresponding remote control devices 190; and Server system data 630 storing at least data associated with control of media display on the display device 106 coupled to the remote control device 190, including:

User account settings 632 for storing account settings of one or more user accounts and device settings of a respective plurality of devices that is associated with each of the user accounts and managed by the server 600, further including:

client device settings 634 for storing information associated with client devices 104, including common device settings (e.g., service tier, device model, storage capacity, processing capabilities, communication capabilities, etc.), and information for automatic media display control;

Casting device settings 636 for storing information associated with casting devices 108 and user accounts of casting device applications 622, including one or more of account access information, information for device settings (e.g., service tier, device model, storage capacity, processing capabilities, communication capabilities, etc.), and information for media display control by the associated casting device 108;

Media application settings 638 for storing information associated with user accounts of one or more media player applications 624, including one or more of account access information, user preferences of media content types, and review history data;

Remote control settings 640 for storing information associated with one or more remote control devices 190, e.g., common device settings (e.g., service tier, device model, storage capacity, processing capabilities, communication capabilities, etc.), media control functions linked to individual buttons, commands and data for implementing each of the media content functions, information of one or more user accounts with which the remote control device is associated, and one or more preferred channel lists for identifying a sequence of Internet content channels; and Device register 642 for storing information of one or more user accounts managed by the server system 140 and information of user devices associated with each of the one or more user accounts; and User account data 642 for storing data that are generated by the applications 622-628 of a respective plurality of devices associated with each of the user accounts managed by the server system 140, e.g., display information associated with media content currently displayed on the display devices 106 coupled to the one or more remote control devices 190.

Each of the above identified elements may be stored in one or more of the previously mentioned memory devices, and corresponds to a set of instructions for performing a function described above. The above identified modules or programs (i.e., sets of instructions) need not be implemented as separate software programs, procedures, modules or data structures, and thus various subsets of these modules may be combined or otherwise re-arranged in various implementations. In some implementations, memory 606, optionally, stores a subset of the modules and data structures identified above. Furthermore, memory 606, optionally, stores additional modules and data structures not described above.

FIG. 6B is an example device register 650 of a server system 140 that stores information of one or more user accounts managed by the server 600 and information of user devices associated with each of the one or more user accounts in accordance with some implementations. In this example, a user account 652 is defined according to an email address (e.g., abc@gmail.com) and associated with a plurality of user devices including casting devices 106 (e.g., Google Chromecast), a surveillance camera 132 (e.g., Nest Camera) and a remote control device 190. The device register 642 stores one or more of a device identification (ID), a device type, a device manufacturer ID and an Internet protocol (IP) address for each user device associated with the user account. The device IDs are assigned to the user devices when the user devices are linked to the user account 652. The manufacturer IDs includes product serial numbers provided by manufacturers to identify the user devices uniquely. When each user device is being linked to the user account 652, the respective manufacturer ID is requested for the purposes of authenticate the respective user device. The IP addresses of the user devices are applied to track the location of the user devices in the Internet. They are acquired during the course of linking the user devices to the user account 652, and updated when locations of the user devices are changed in the Internet.

In some implementations, a first user device associated with the user account 652 is linked to a second user device associated with the user account 652. For example, the remote control device 190 (Device ID=10) is linked to the casting device 108 (Device ID=1), but not to the casting device 108 (Device ID=2). In some implementations, the user account 652 includes two or more remote control devices 190, each of the remote control devices 190 is uniquely linked to a specific casting device 108. In some implementations, the user account 652 includes one remote control device 190 that are linked to more than one casting or display device according to a predetermined linking rule (e.g., according to a distance of the remote control device 190 to any one of the more than one casting or display device).

Figure 7:
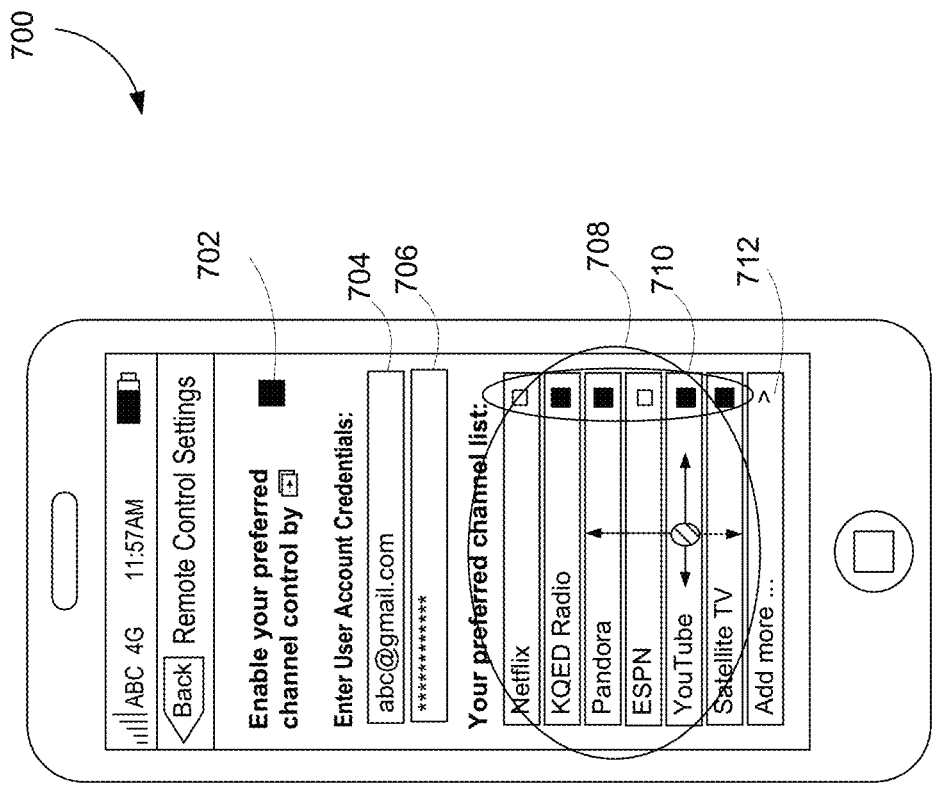
FIG. 7 is an example user interface displayed on a client device for prompting a user to define a preferred channel list of a remote control device associated with a user account managed by a server in accordance with some implementations.

FIG. 7 is an example user interface 700 displayed on a client device 104 for prompting a user to define a preferred channel list of a remote control device 190 associated with a user account managed by a server 600 in accordance with some implementations. The client device 104 is used to set forth the preferred channel list as part of remote control settings of the remote control device 190. When the remote control settings have been properly set for the remote control device 190, the remote control device 190 can independently initiate a plurality of media control functions (e.g., channel surfing, program surfing, content previewing and backdrop reviewing) without displaying a complicated remote control interface on the client device 104 or a display device 106 to request user intervention in channel switching/surfing.

In some implementations, the user interface 700 includes a preferred channel control 702 to enable or disable a channel surfing function related to a specific user button of the remote control device 190. In some implementations, the user interface 700 is configured to prompt a user to enter user account credentials of the user account (e.g., a user account name 704 and password 706). When the user account name 704 and password 706 are verified, the server system 140 confirms whether the remote control device 190 has been linked to the user account and whether the preferred channel list can be set forth or updated for the remote control device 190. In some implementations, the user interface 706 further includes selectable information items 708 representing one or more Internet content channels (e.g., Netflix, KQED Radio, Pandora, ESPN, YouTube, and SatelliteTV). The user clicks on a respective selectable square affordance 708 to add a corresponding Internet content channel to or remove it from the preferred channel list associated with the user account. If an interested Internet content channel is not listed on the user interface 700, the user clicks on an add-more affordance 712 to select the interested Internet content channel from an expanded list of Internet content channels. The interested Internet content channel, once selected from the expanded list, is added to and displayed in the selectable information items 708 of the user interface 700.

In some implementations, the user holds a touch on one of the listed Internet content channels on the user interface 700, and drags the one of the listed Internet content channels up or down the preferred channel list. By this means, a sequence of Internet content channels of the preferred channel list is arranged according to a predetermined channel order. Alternatively, in some implementations, the user swipes left or right on the one of the listed Internet content channels, and the swiped Internet content channel is removed from the user interface 700 and hid into the expanded list of Internet content channels associated with the add more affordance 712.

Figure 8:
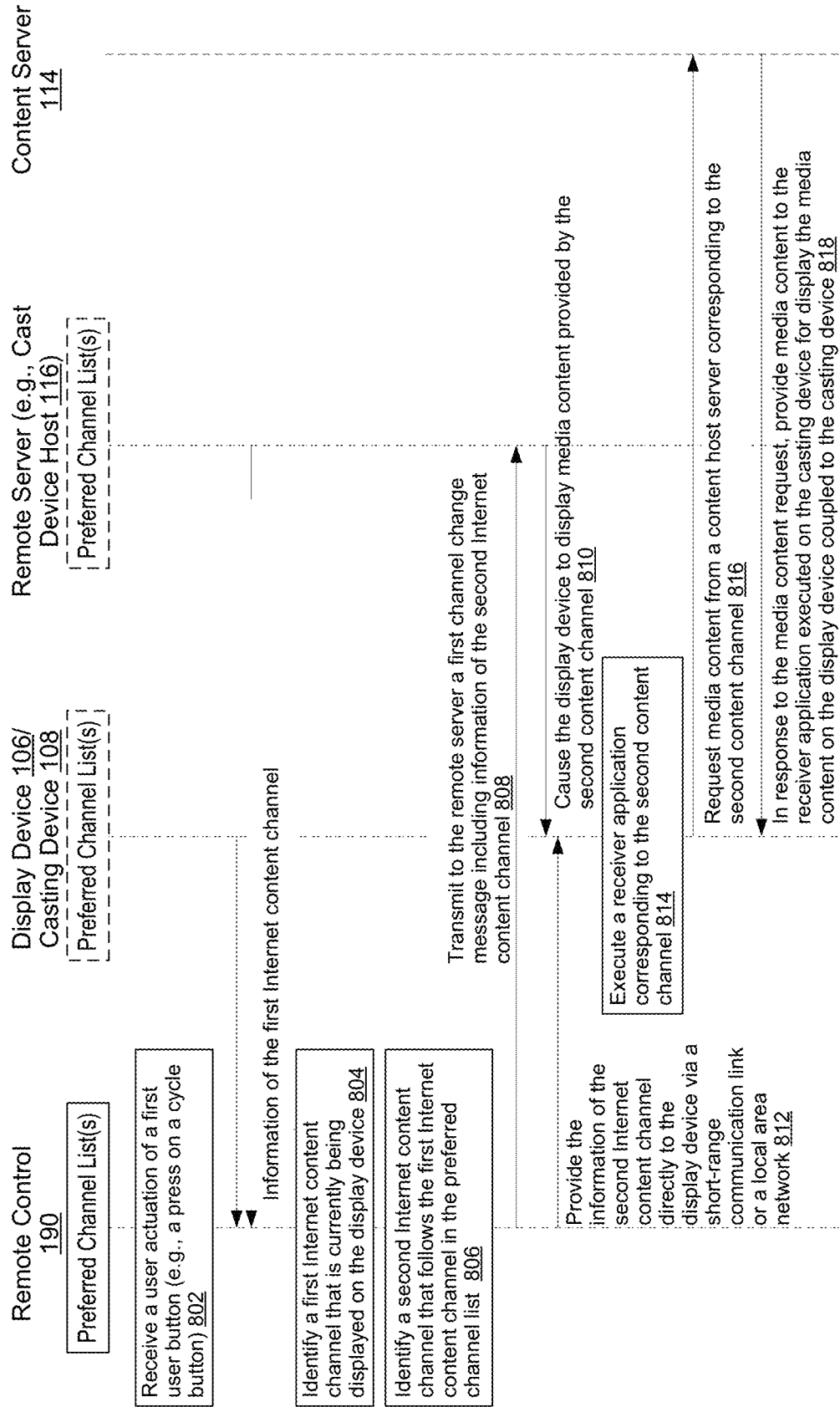
FIGS. 8-10 illustrate Internet content channel reviewing processes initiated by a user actuation of a user button on a remote control device in accordance with some implementations.
Figure 9:
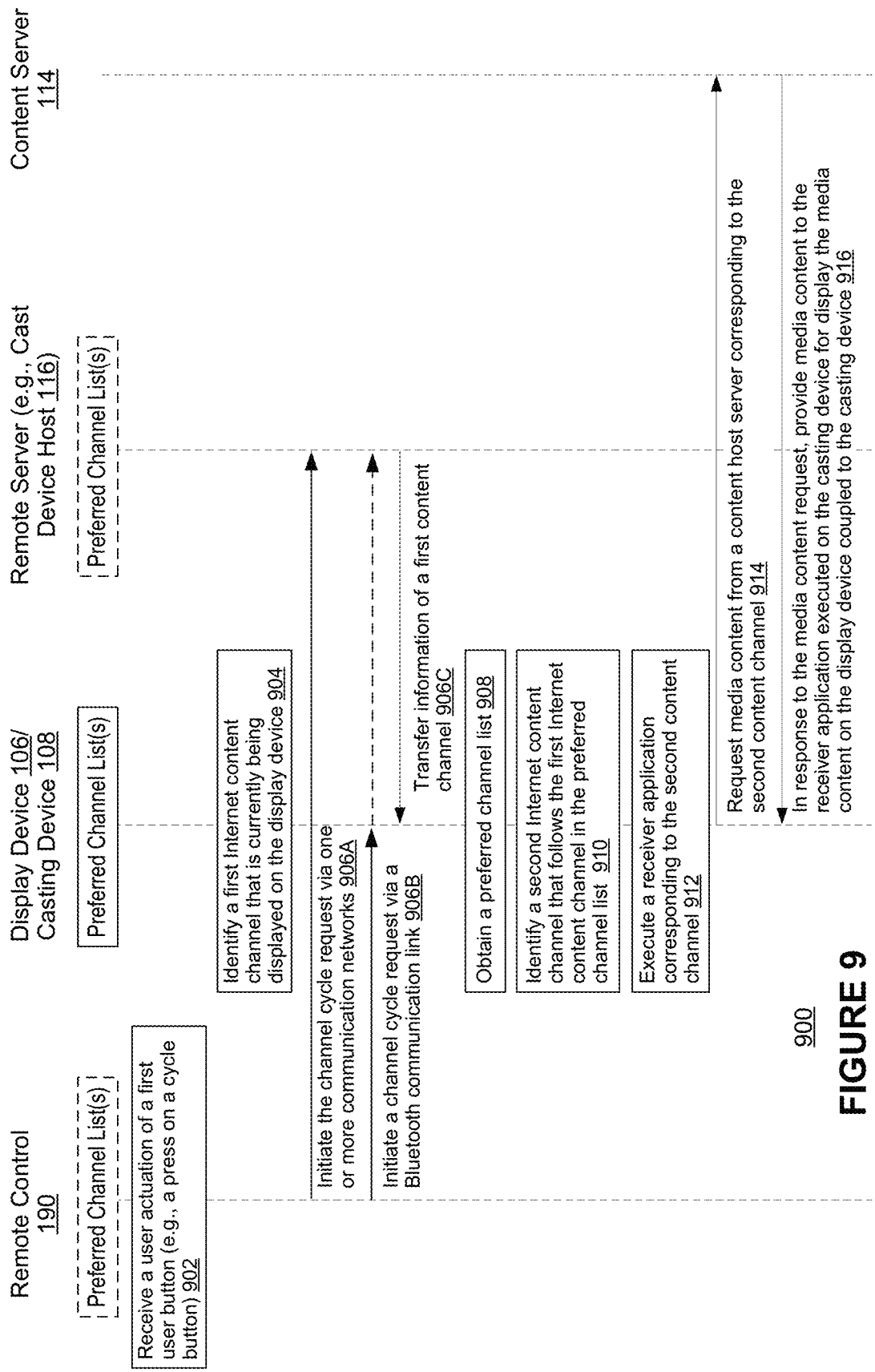
Figure 10:
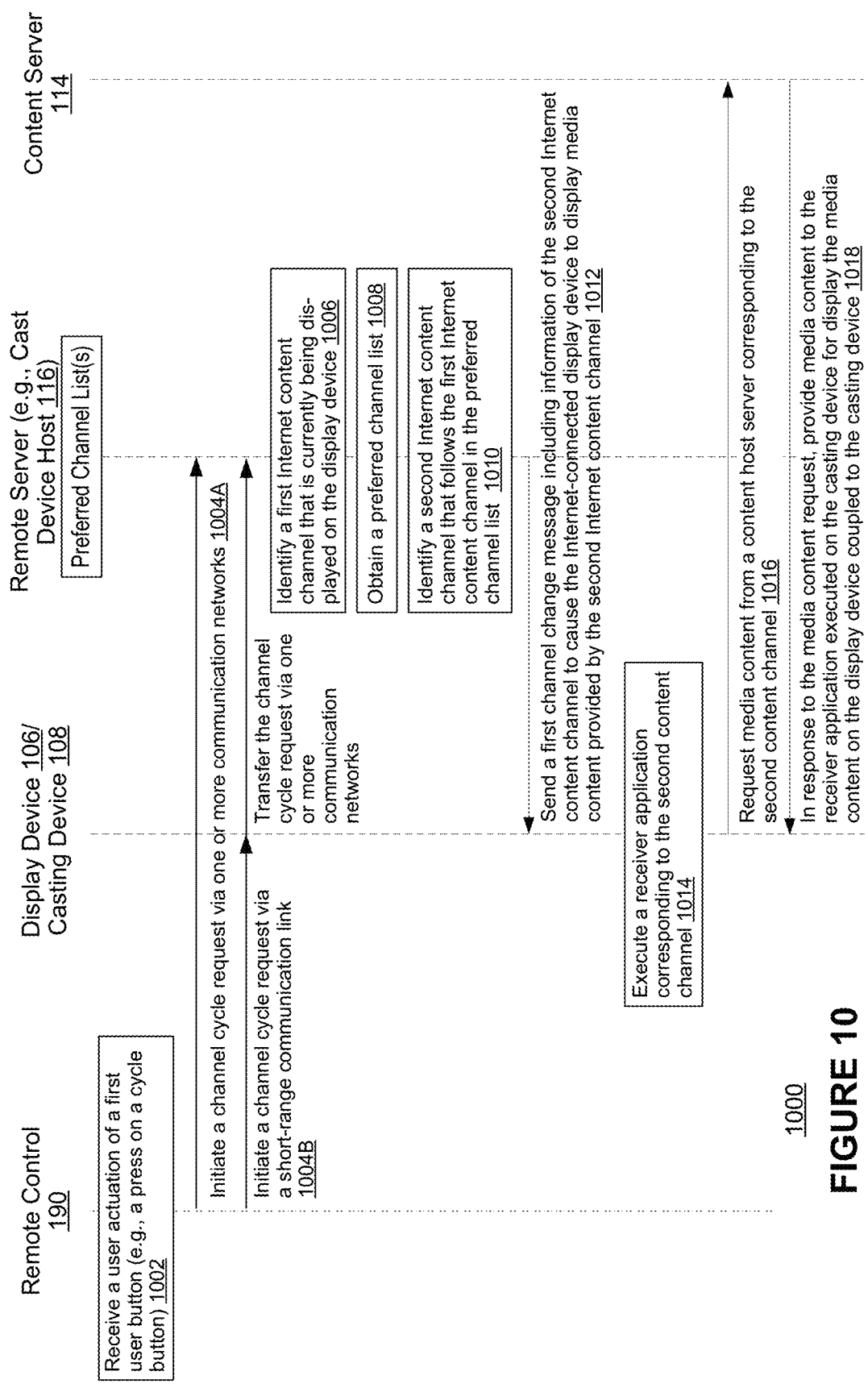

FIGS. 8-10 illustrate Internet content channel reviewing processes 800, 900 and 1000 initiated by a user actuation of a user button (e.g., the cycle button 308) on a remote control device 190 in accordance with some implementations. A display device 106 associated with the remote control device 190 displays media content provided by a first Internet content channel at the time of the user actuation on the user button on the remote control device 190. The Internet content channel reviewing processes 800, 900 and 1000 rely on the remote control device 190, the device or casting device, and a remote server (e.g., the cast device host 116) to identify a second Internet content channel according to a preferred channel list, respectively. The second Internet content channel provides media content for display on the display device 106 in response to the user actuation on the user button on the remote control device 190. The remote control device 190 and the display device 106 are associated with a first user account maintained by the remote server.

Referring to FIG. 8, the remote control device 190 includes one or more processors 322 and memory 326 storing instructions for execution by the one or more processors 322. The Internet content channel reviewing process 800 is initiated and partially implemented by the remote control device 190. The remote control device 190 receives (802) a user actuation of a first user button (e.g., a press on a cycle button 308), and then identifies (804) a first Internet content channel that is currently being displayed on the display device. In some implementations, the information of the first Internet content channel was stored or updated in the memory of the remote control device 190 when the first Internet content channel was last selected for display on the display device. In some implementations, information of the first Internet content channel is downloaded from the remote server in response to the user actuation on the first user button, and the information of the first Internet content channel was previously provided to the remote server when the first Internet content channel was last selected for display on the display device 106. In some implementations, the information of the first Internet content channel is obtained from the display device 106 or a casting device 108 coupled to the display device 106.

The remote control device 190 obtains a preferred channel list that includes a sequence of Internet content channels that is associated with the first user account and arranged according to a predetermined channel order. The sequence of Internet content channels includes the first Internet content channel. Media content of each Internet content channel is provided via the Internet by one of the one or more content servers 114. In some implementations, the preferred channel list is downloaded from the remote server, and stored in the memory of the remote control device 190. The preferred channel list could be downloaded from the remote server every time when the display device 106 is powered on, every time when the Internet-enabled casting device 108 is powered on, in response to the user actuation on the first user button or when the remote control device receives from the remote server an update command to request an update of the preferred channel list in the remote control device 190. Optionally, the server is configured to send the update command to request the update of the preferred channel list in the remote control device 190 when the preferred channel list is modified by a user.

In accordance with the preferred channel list, the remote control device 190 identifies (806) a second Internet content channel that follows the first Internet content channel in the preferred channel list. In some implementations, information of the second Internet content channel is stored in the memory of the remote control device 190, and used to respond to another actuation on the first user button that follows the first user actuation.

In some implementations, the remote control device 190 transmits (808) to the remote server a first channel change message including information of the second Internet content channel, and the remote server then causes (810) the Internet-connected display device 106 to display media content provided by the second content channel. Alternatively, in some implementations, the remote control device 190 provides (812) the information of the second Internet content channel directly to the display device 106 or the casting device 108 via a short-range communication link or a local area network. Upon receiving the information of the second Internet content channel, the casting device 108 executes (814) a media receiver application 522 corresponding to the second Internet content channel, requests (816) media content from a content host server 114 corresponding to the second Internet content channel, and receives (818) the media content for display on the display device 106.

In some implementations, the display device 106 is associated with the Internet-enabled casting device 108 configured to receive the media content from the sequence of Internet content channels. The Internet-enabled casting device 108 is configured to receive (e.g., 812) Internet tuning information for the second Internet content channel (including the information of the second Interne content channel) and execute (e.g., 814) a receiver application corresponding to the second Internet content channel for displaying the media content provided by the second Internet content channel. In some implementations, the casting device 108 is configured to execute a distinct receiver application to enable display of each Internet content channel of the sequence of Internet content channels on the display device 106. In some situations, the remote control device 190 is communicatively coupled to the Internet-based casting device 108 via a short-range radio communication network using a Bluetooth-based wireless protocol, and configured to exchange data with the Internet-based casting device 108 via the short-range radio communication network. The remote control device 190 can receive from the casting device 108 the preferred channel list via the short-range radio communication network, and provide to the casting device 108 the information of the second Internet content channel via the short-range radio communication network.

In some implementations, the remote control device 190 is communicatively coupled in a local area network 110, and configured to directly communicate with the remote server and exchange data with the remote server via the local area network. The remote control device 190 receives from the remote server the preferred channel list via the local area network without involving an Internet-enabled casting device 108, and provides the information of the second Internet content channel via the local area network to the server that is configured to provide the information of the second Internet content channel to the Internet-enabled casting device 108.

Referring to FIG. 9, the casting device 106 is coupled to the display device 108, and includes one or more processors 502 and memory 506 storing instructions for execution by the one or more processors 502. The Internet content channel reviewing process 900 is initiated at the remote control device 190, and however, the second Internet content channel is identified by the casting device 190. The remote control device 190 receives (902) a user actuation of a first user button (e.g., a press on a cycle button 308). In response to the user actuation on the first user button, the casting device 106 identifies (904) a first Internet content channel that is currently displayed on the display device 108. In some implementations, information of the first Internet content channel is stored in and retrieved from the memory 506 of the casting device 108. In some implementations, the remote control device 190 sends a channel cycle request directly (906A) to a remote server via one or more communication networks 112, or indirectly (906B) to the remote server via a short-range communication link with the casting or display device. The remote server identifies the first user account associated with the remote control device 190, determines the first Internet content channel associated with the first user account, and provides (906C) the information of the first Internet content channel to the casting device 108.

Additionally, the casting device 108 obtains (908) a preferred channel list that includes a sequence of Internet content channels that is associated with the first user account and arranged according to a predetermined channel order. The sequence of Internet content channels includes the first Internet content channel. Media content of each Internet content channel is provided via the Internet by one of the one or more content servers 114. In some implementations, the preferred channel list is downloaded from the remote server, and stored in the memory of the casting device 190. The preferred channel list could be downloaded from the remote server every time when the display device 106 or the casting device 108 is powered on, in response to the user actuation on the first user button or when the remote control device receives from the remote server an update command to request an update of the preferred channel list in the casting device 108. Optionally, the remote server is configured to send the update command to request the update of the preferred channel list in the casting device 108 when the preferred channel list is modified by a user.

In accordance with the preferred channel list, the casting device 108 identifies (910) a second Internet content channel that follows the first Internet content channel in the preferred channel list, and causes the display device 106 to display media content provided by the second Internet content channel. Specifically, upon identifying the second Internet content channel, the casting device 108 executes (912) a media receiver application 522 corresponding to the second Internet content channel, requests (914) media content from a content host server 114 corresponding to the second Internet content channel, and receives (916) the media content for display on the display device 106. In some implementations, information of the second Internet content channel is stored in the memory of the remote control device and/or updated to the remote server, and used to respond to a subsequent actuation on the first user button that follows the first user actuation.

Referring to FIG. 10, a remote server (e.g., the content host server 114) includes one or more processors 602 and memory 606 storing instructions for execution by the one or more processors 602. The Internet content channel reviewing process 1000 is initiated at the remote control device 190, and however, the second Internet content channel is identified by the remote server. The remote control device 190 receives (1002) a user actuation of a first user button (e.g., a press on a cycle button 308). The remote control device 190 sends a channel cycle request directly (1004A) to the remote server via one or more communication networks 112, or indirectly (1004B) to the remote server via a short-range communication link with the casting or display device. Upon receiving the channel cycle request and in response to the user actuation on the first user button, the remote server identifies (1006) the first user account associated with the remote control device 190, and determines a first Internet content channel that is currently displayed on the display device 108 associated with the first user account. Alternatively, in some implementations, information the first Internet content channel is obtained from the memory of the casting device 108.

Additionally, the remote server obtains (1008) a preferred channel list that includes a sequence of Internet content channels that is associated with the first user account and arranged according to a predetermined channel order. The sequence of Internet content channels includes the first Internet content channel. Media content of each Internet content channel is provided via the Internet by one of the one or more content servers 114. In some implementations, the preferred channel list is stored in the memory of the remote server in association with the display device 106 associated with the first user account. The preferred channel list could be downloaded and updated to one or more of the display device 106, the casting device 108 and the remote control device 190 every time when the display device 106 or the casting device 108 is powered on, in response to the user actuation on the first user button or when the remote control device receives from the remote server an update command to request an update of the preferred channel list in the display device 106, the casting device 108 and the remote control device 190 associated with the first user account. Optionally, the remote server is configured to send the update command to request the update of the preferred channel list in devices associated with the first user account when the preferred channel list is modified by a user.

In accordance with the preferred channel list, the remote server identifies (1010) a second Internet content channel that follows the first Internet content channel in the preferred channel list, and sends (1012) a first channel change message including information of the second Internet content channel to cause the Internet-connected display device 106 to display media content provided by the second Internet content channel. Specifically, upon receiving the information of the second Internet content channel, the casting device 108 executes (1014) a media receiver application 522 corresponding to the second Internet content channel, requests (1016) media content from a content host server 114 corresponding to the second Internet content channel, and receives (1018) the media content for display on the display device 106. In some implementations, information of the second Internet content channel is stored in the memory of the casting device 108 or the remote server, and used to respond to a subsequent actuation on the first user button that follows the first user actuation.

In accordance with any of the Internet content channel reviewing processes 800, 900 and 1000, when a user consecutively actuates the first user button, media content received from the sequence of Internet content channels of the preferred channel list are sequentially displayed on the display device 106, thereby enabling channel surfing experience for the user.

Figure 11:
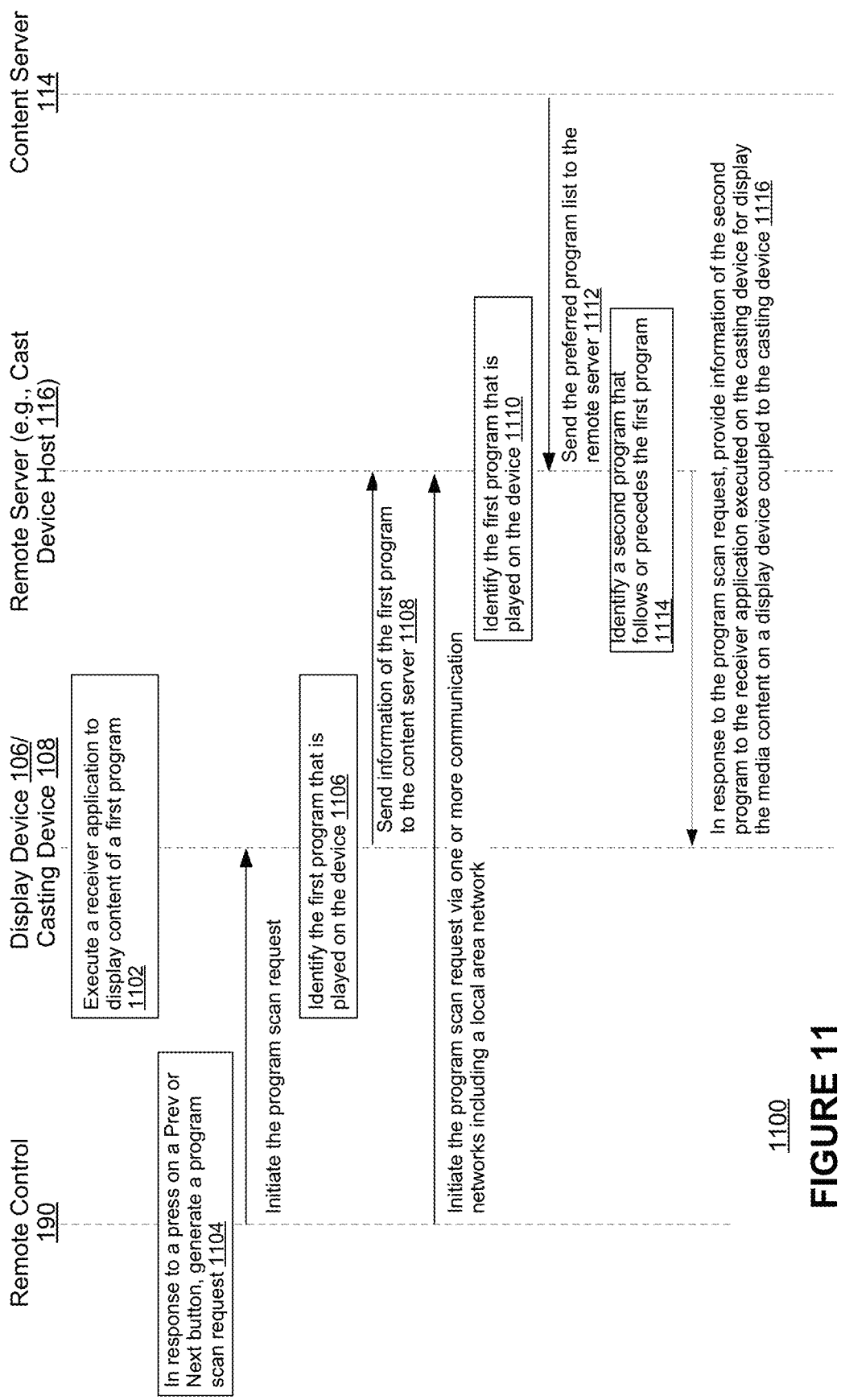
FIG. 11 is a block diagram showing a program reviewing processes initiated by a user actuation of a user button (e.g., a previous button and a next button) on a remote control device in accordance with some implementations.

FIG. 11 is a block diagram showing a program reviewing processes 1100 initiated by a user actuation of a user button (e.g., a previous button 310 and a next button 312) on a remote control device 190 in accordance with some implementations. Media content provided by an Internet content channel (e.g., the second Internet content channel shown in FIGS. 8-10) is associated with a first program (e.g., a first music video clip) provided by the Internet content channel. Optionally, a casting device 108 coupled to the display device 104 executes (1102) a receiver application to display media content provided by the Internet content channel. In response to a user actuation of one of the previous and next buttons 310 and 312, the remote control device 190 generates (1104) a program scan request to request display of a second program provided by the Internet content channel.

Information of the second program is determined by one of the display device 106, the casting device 108, the remote server and a content server 114 of the Internet content channel based on a preferred program list associated with the Internet content channel and information of the first program. In an example as shown in FIG. 11, in response to the program scan request, the display or casting device identifies (1106) the first program, and sends (1108) information of the first program to the remote server. In some implementations, in response to the program scan request, the remote server (e.g., the cast device host 116) identifies (1110) the first program associated with the first user account.

In some implementations not shown in FIG. 11, the remote server retrieves from its own memory a preferred program list associated with the Internet content channel according to the first user account, while in some other implementations as shown in FIG. 11, the remote server receives (1112) from the content server 114 the preferred program list. The remote server then identifies (1114) a second program that follows or precedes the first program in the preferred program list, and provides (1116) information of the second program to the receiver application executed on the casting device 108 for displaying the media content of the second program on the display device 106.

Although FIG. 11 shows a program reviewing process 1110 that relies on the remote server (e.g., the cast device host 116) to identify the second program offered by the Internet content channel, it is noted that the information of the first program and preferred program list can be provided to any other device (e.g., the display device 106, the casting device 108, the remote control device 190 and the content server 114), such that the respective device is used to implement a similar program reviewing process to identify the second program. Information of the second program can be provided by the respective device to the display or casting device for displaying the media content of the second program on the display device 106.

In some implementations, the first user account is associated with a guest review account of the Internet content channel, and the preferred program list associated with the Internet content channel includes a sequence of preferred programs arranged according to a default order defined by the Internet content channel for guests of the Internet content channel. The first and second programs are two consecutive programs in the preferred program list. In some situations, when the next button 312 is actuated, the second program follows the first program in the preferred program list, and when the previous button 310 is pressed, the second program precedes the first program in the preferred program list. Alternatively, in some implementations, the first user account is associated with a user review account of the Internet content channel, and the preferred program list associated with the Internet content channel includes a sequence of preferred programs arranged according to a predetermined program order customized for the user review account of the Internet content channel. The first and second programs are two consecutive programs in the sequence of preferred programs. For example, when the Internet content channel includes YouTube, the preferred program list includes a playlist of a YouTube user account. In some implementations, the preferred program list starts with the second program and ends with the first program.

In accordance with the program reviewing processes 1100, the user actuation on the previous button 310 launches media content of a media program in the preferred program list of a specific Internet content channel (e.g., Netflix), and consecutive user actuations of the previous button 310 allow a user to browse through at least part (if not all) of media programs in the preferred program list of the specific Internet channel. Similar media display control is made possible by one or more user actuation on the next button 312, except that the user actuations of the previous and next buttons result in opposite orders of reviewing the media programs in the preferred program list of the specific Internet content channel. Stated another way, when the user repeatedly actuates the previous or next button, media content received from the sequence of programs are sequentially displayed on the display device 106 according to the preferred program list, thereby enabling program surfing experience associated with the specific Internet content channel for the user.

Figure 12:
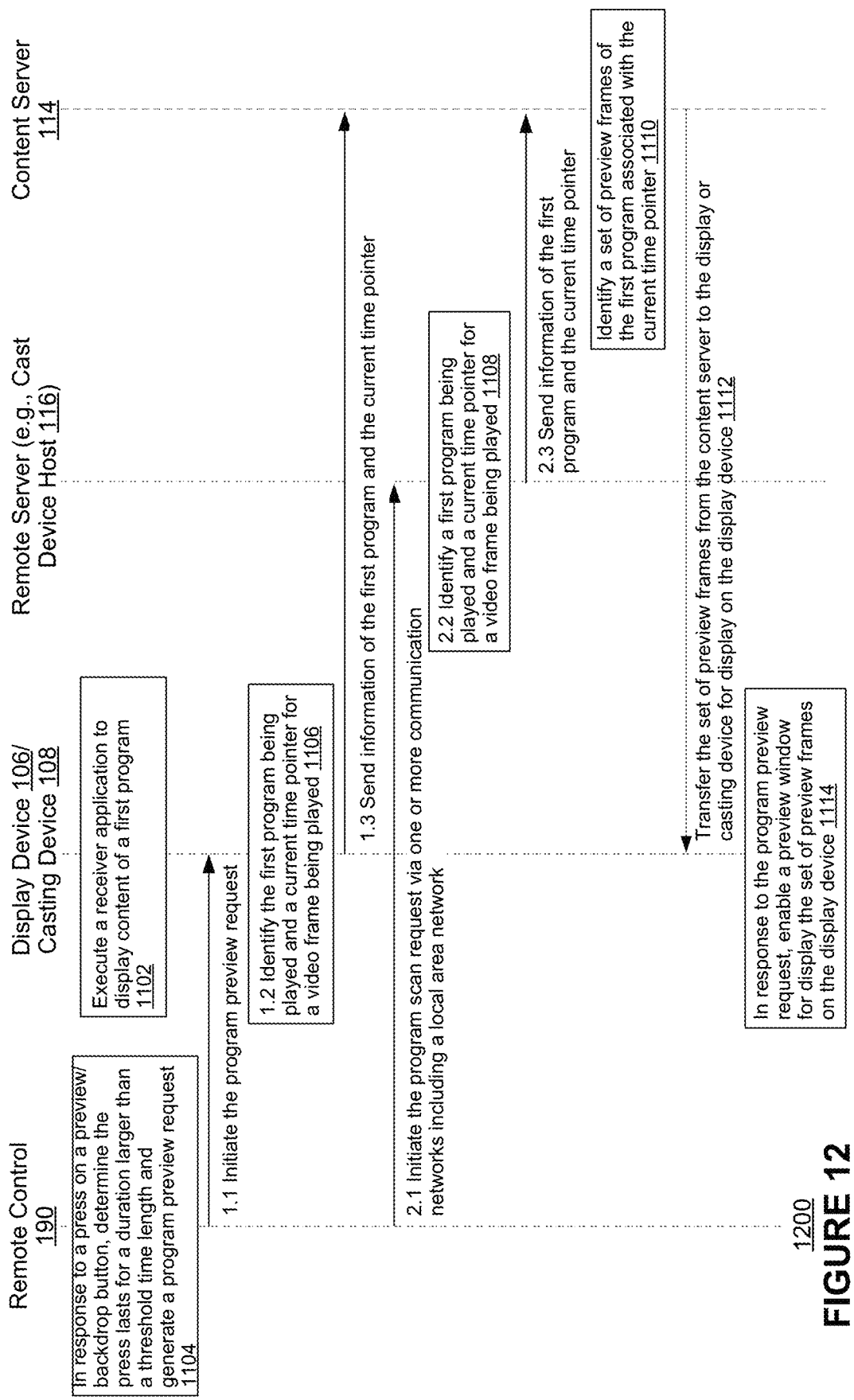
FIG. 12 is a block diagram showing a content previewing processes initiated by a user actuation of a user button (e.g., a preview/backdrop button) on a remote control device in accordance with some implementations.

FIG. 12 is a block diagram showing a content previewing processes 1200 initiated by a user actuation of a user button (e.g., a preview/backdrop button 314) on a remote control device 190 in accordance with some implementations. Media content provided by an Internet content channel (e.g., the second Internet content channel shown in FIGS. 8-10) is associated with a first program (e.g., a first music video clip) provided by the Internet content channel. Optionally, a casting device 108 coupled to the display device 104 executes (1102) a receiver application to display media content provided by the Internet content channel. In response to a user actuation of the preview/backdrop button 314, the remote control device 190 generates (1104) a program preview request to request display of a set of subsequent media frames (also called preview frames) related to the first program of the Internet content channel. In some implementations, the program preview request is generated in accordance with a determination that the user actuation of the preview/backdrop button includes a press lasting for a duration of time longer than a threshold time length.

In some implementations, in response to the program preview request, the display or casting device identifies (1106) the first program that is displayed thereon and a current time pointer associated with a video frame that is currently displayed. Alternatively, in some implementations, in response to the program preview request, the cast device host 116 determines (1108) the first program that is displayed on the display device and the current time pointer associated with the video frame that is currently displayed. Specifically, the cast device host 116 identifies the first user account associated with the remote control device 190, determines the casting and display devices associated with the first user account, and therefore, obtains information of the first program and current time pointer. Then, the information of the first program and current time pointer is sent to the content server 114 for identifying (1110) the set of subsequent media frames following a currently displayed video frame of the first program. The content server 114 provides (1112) the set of subsequent media frames to the display or casting device for display on the display device 106. In some implementations, the Internet-enabled casting device 108 coupled to the display device 106 enables (1114) a preview window for displaying the set of subsequent media frames on the display device 106, and the preview window is overlaid on the media content displayed on the display device 106.

Figure 13:
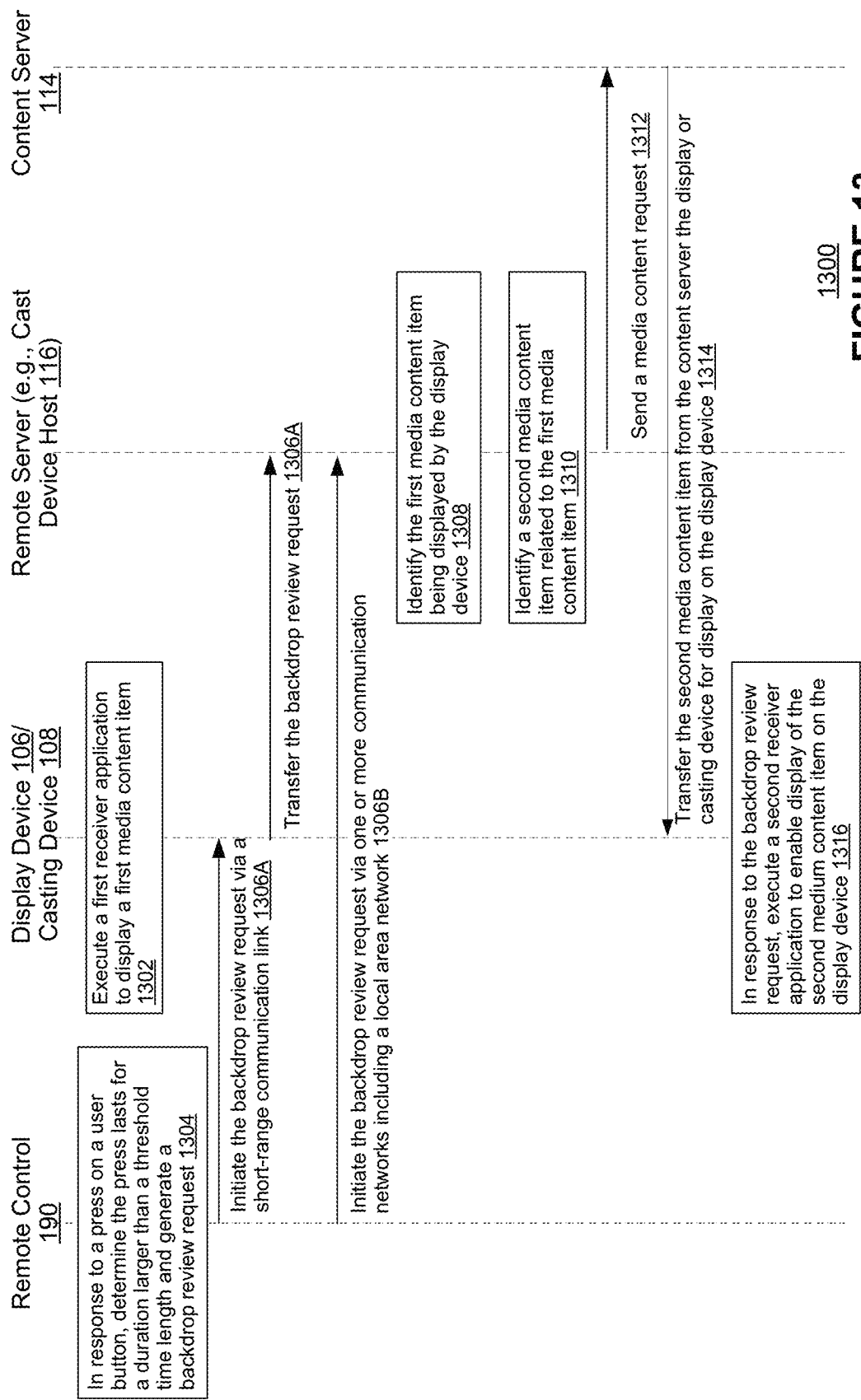
FIG. 13 is a block diagram showing a backdrop reviewing processes initiated by a user actuation of a user button (e.g., a preview/backdrop button) on a remote control device in accordance with some implementations.

FIG. 13 is a block diagram showing a backdrop reviewing processes 1300 initiated by a user actuation of a user button (e.g., a preview/backdrop button 314) on a remote control device 190 in accordance with some implementations. Media content provided by a specific Internet content channel (e.g., the second Internet content channel shown in FIGS. 8-10) is associated with a first media content item (e.g., a news clip or a music video clip) provided by the specific Internet content channel. Optionally, a casting device 108 coupled to the display device 104 executes (1302) a first receiver application to display the first media content item provided by the specific Internet content channel. In response to a user actuation of the preview/backdrop button 314, the remote control device 190 generates (1304) a backdrop review request to request display of backdrop media items related to the first media content item provided by the specific Internet content channel. In some implementations, the backdrop review request is generated in accordance with a determination that the user actuation of the preview/backdrop button includes a press lasting for a duration of time longer than a threshold time length.

The backdrop review request is sent directly (1306B) to the remote server (e.g., the cast device host 116) via one or more communication networks 112, or indirectly (1306A) to the remote server via a short-range communication link with the casting or display device. In response to the backdrop review request, the cast device host 116 determines (1308) the first media content item that is displayed on the display device 106, and identifies (1310) at least a second media content item related to the first media content item. The cast device host 116 then sends a media play command to instruct the display or casting device to play the second media content item. Specifically, the cast device host 116 sends (1312) a media content request to request the second media content item from a corresponding content server 114. The content server 114 transfers (1314) the second media content item to the display or casting device for display on the display device 106. The casting device 108 executes a second receiver application to enable display of the second media content item on the display device 106. In some implementations, the second receiver application is distinct from the first receiver application.

Specifically, in some implementations, one or more media items related to the first media content item are identified by the cast device host 116 based on an Internet-based search. In some implementations, in response to the backdrop review request, the cast device host 116 provides information of the one or more media items to the display device 106 via the Internet-based casting device 108. The Internet-based casting device 108 enables display of the information of the one or more media items on the display device 104, and in response to a selection of one of the one or more media items by a viewer, enables display of media content corresponding to the selected one of the one or more media items on the display device 106. Further, in some implementations, the Internet-based casting device 108 enables display of the first media content item of the specific Internet content channel by a first receiver application, and display of the selected one of the one or more media items by a second receiver application that is distinct from the first receiver application Processes 800, 900, 1000, 1100, 1200 and 1300 are, optionally, governed by instructions that are stored in a non-transitory computer readable storage medium and that are executed by one or more processors of a remote control device 190, a display device 106, a cast device, and a server system 140. Each of the operations shown in FIGS. 8-13 may correspond to instructions stored in the computer memory or computer readable storage medium (e.g., memory 326 of the remote control device 190 in FIG. 3B). The computer readable storage medium may include a magnetic or optical disk storage device, solid state storage devices such as Flash memory, or other non-volatile memory device or devices. The computer readable instructions stored on the computer readable storage medium may include one or more of: source code, assembly language code, object code, or other instruction format that is interpreted by one or more processors. Some operations in each of the processes 800, 900, 1000, 1100, 1200 and 1300 may be combined and/or the order of some operations may be changed.

It should be understood that the particular order in which the operations in FIGS. 8-13 have been described are merely exemplary and are not intended to indicate that the described order is the only order in which the operations could be performed. One of ordinary skill in the art would recognize various ways to cache and distribute specific data as described herein. Additionally, it should be noted that details of other processes described with respect to any one of processes 800-1300 are also applicable in an analogous manner to other processes of processes 800-1300. For brevity, these details are not repeated.

Figure 14:
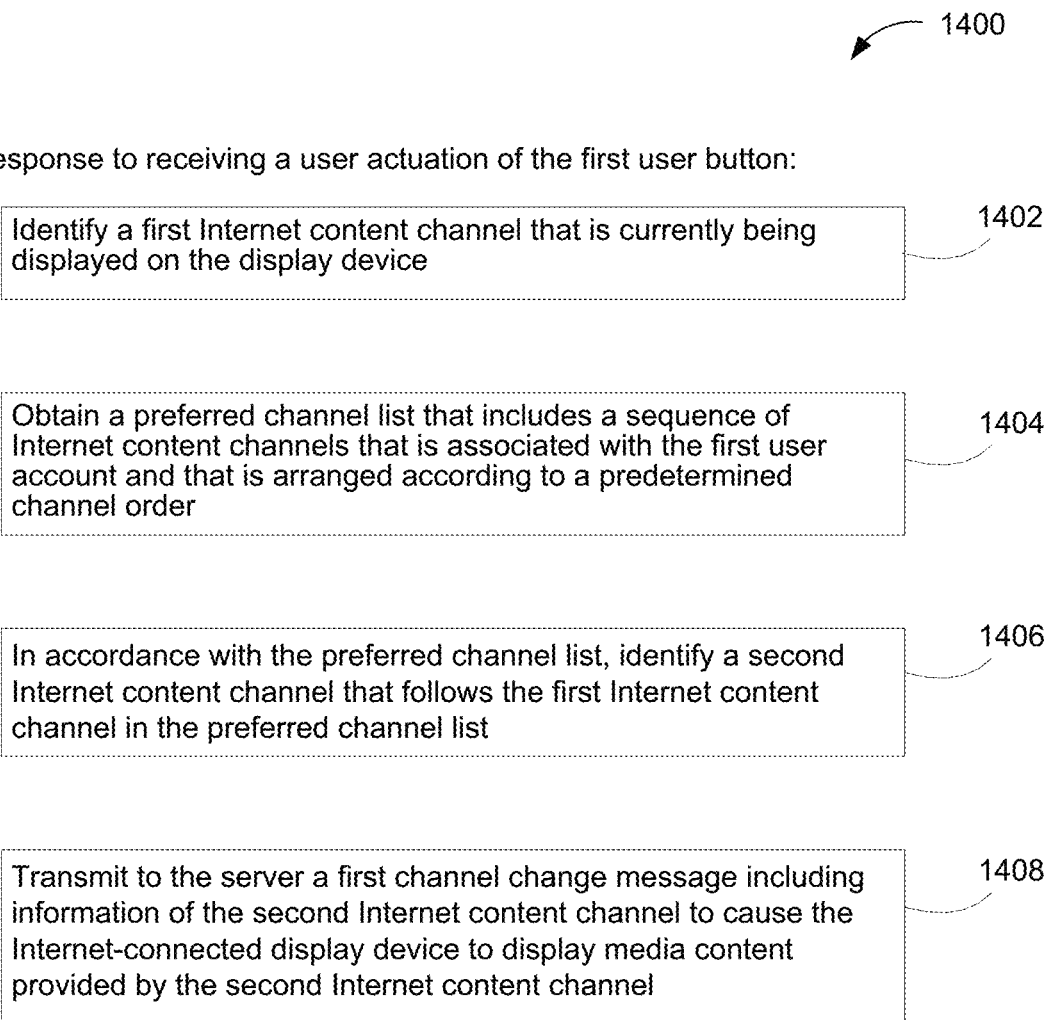
FIG. 14 is a flowchart of a method of reviewing Internet content channels on an Internet-connected display device in accordance with some implementations.

FIG. 14 is a flowchart of a method 1400 of reviewing Internet content channels on an Internet-connected display device 104 in accordance with some implementations. The method is implemented at an Internet-connected remote control device 190 having a first user button (e.g., a cycle button 308), one or more processors (e.g., CPU 322), and memory 326 storing instructions for execution by the one or more processors. The remote control device 190 and the display device 106 are associated with a first user account maintained at a server (e.g., a cast device host 116 of a server system 140). In response to receiving a user actuation of the first user button, the remote control device 190 identifies (1402) a first Internet content channel that is currently being displayed on the display device 106, and obtains (1404) a preferred channel list that includes a sequence of Internet content channels that is associated with the first user account and that is arranged according to a predetermined channel order. The sequence of Internet content channels includes the first Internet content channel. In accordance with the preferred channel list, the remote control device identifies (1406) a second Internet content channel that follows the first Internet content channel in the preferred channel list, and transmits (1408) to the server a first channel change message including information of the second Internet content channel to cause the Internet-connected display device 106 to display media content provided by the second Internet content channel.

In some implementations, the remote control device 190 is configured to control display of media content received from the sequence of Internet content channels on the display device 106, and the display device 104 is associated with an Internet-enabled casting device 108 configured to receive the media content from the sequence of Internet content channels. Further, in some implementations, the Internet-enabled casting device 108 is configured to execute a distinct receiver application to enable display of each Internet content channel of the sequence of Internet content channels on the display device 106.

In some implementations, the predetermined channel order of the preferred channel list is customized for the first user account, and the first and second Internet content channels are two consecutive programs in the sequence of Internet content channels. Further, in some implementations, the sequence of Internet content channels is selected and arranged to the predetermined channel order on a user interface displayed on a client device 104.

In some implementations, the remote control device 190 downloads from the server the preferred channel list, and stores/updates the preferred channel list in the memory of the remote control device 190. Further, in some implementations, the preferred channel list is downloaded from the server every time when the display device is powered on, every time when the Internet-enabled casting device is powered on, in response to the user actuation of the first user button or when the remote control device receives from the server an update command to request an update of the preferred channel list in the remote control device 190. In some situations, the server is configured to send the update command to request the update of the preferred channel list in the remote control device when the preferred channel list associated with the first user account is modified. Likewise, in some implementations, the remote control device 190 downloads from the server the information of the first Internet content channel, and stores/updates the information of the first Internet content channel in the memory of the remote control device.

In some implementations, the user actuation of the first user button includes a first user actuation. After identifying the second Internet content channel, the remote control device 190 stores information of the second Internet content channel in the memory of the remote control device. The information of the second Internet content channel is used to respond to a second actuation of the first user button that follows the first user actuation.

In some implementations, the remote control device 190 further includes a previous button 310 and a next button 312 that are distinct from each other and from the first user button. The media content provided by the second Internet content channel is displayed on the display device, and includes a first program provided by the second Internet content channel. In response to a user actuation of one of the previous and next buttons, the remote control device 190 generates a program scan request to request display of a second program provided by the second Internet content channel. Information of the second program is determined by one of an Internet-enabled casting device, the server and a content host of the second Internet content channel based on a preferred program list associated with the second Internet content channel and information of the first program. Further, in some implementations, when the next button is actuated, the second program follows the first program in the preferred program list, and when the backward button is pressed, the second program precedes the first program in the preferred program list. Further, in some implementations, the first user account is associated with a user review account of the second Internet content channel, and the preferred program list associated with the second Internet content channel includes a sequence of preferred programs arranged according to a predetermined program order customized for the user review account of the second Internet content channel, the first and second programs being two consecutive programs in the sequence of preferred programs.

In some implementations, the remote control device comprises a plurality of buttons including the first user button. The media content provided by the second Internet content channel is displayed on the display device, and includes a first program provided by the second Internet content channel. In response to a user actuation of one of the plurality of buttons on the remote control device, the remote control device 190 generates a program preview request for displaying a set of preview frames related to the first program. Further, in some implementations, the program preview request is generated in accordance with a determination that the user actuation of the one of the plurality of buttons includes a press lasting for a duration of time longer than a threshold time length.

In some implementations, the remote control device 190 has a plurality of buttons including the first user button. The media content provided by the second Internet content channel is displayed on the display device 106, and includes a first program provided by the second Internet content channel. In response to a user actuation of one of the plurality of buttons on the remote control device, the remote control device 190 generates a backdrop review request for displaying one or more media items related to the media content currently displayed on the display device. Further, in some implementations, the Internet-enabled casting device 108 is configured to enable display of the media content of the second Internet content channel by a first receiver application and display of the selected one of the one or more media items by a second receiver application that is distinct from the first receiver application.

More details on the method 1400 for reviewing Internet content channels on an Internet-connected display device are explained above with reference to FIGS. 8-13. Method 1400 is, optionally, governed by instructions that are stored in a non-transitory computer readable storage medium and that are executed by one or more processors of an electronic device (e.g., a remote control device 190). Each of the operations shown in FIG. 14 may correspond to instructions stored in the computer memory or computer readable storage medium (e.g., memory 326 of the remote control device 190 in FIG. 3B). The computer readable storage medium may include a magnetic or optical disk storage device, solid state storage devices such as Flash memory, or other non-volatile memory device or devices. The computer readable instructions stored on the computer readable storage medium may include one or more of: source code, assembly language code, object code, or other instruction format that is interpreted by one or more processors. Some operations in the method 1400 may be combined and/or the order of some operations may be changed.

It should be understood that the particular order in which the operations in FIG. 14 have been described are merely exemplary and are not intended to indicate that the described order is the only order in which the operations could be performed. One of ordinary skill in the art would recognize various ways to cache and distribute specific data as described herein. Additionally, it should be noted that details of other processes described with respect to any one of processes 800-1300 are also applicable in an analogous manner to the method 1400. For brevity, these details are not repeated.

It will also be understood that, although the terms first, second, etc. are, in some instances, used herein to describe various elements, these elements should not be limited by these terms. These terms are only used to distinguish one element from another. For example, a first type of audio feature can be termed a second type of audio feature, and, similarly, a second type of audio feature can be termed a first type of audio feature, without departing from the scope of the various described implementations. The first type of audio feature and the second type of audio feature are both types of audio features, but they are not the same type of audio feature.

The terminology used in the description of the various described implementations herein is for the purpose of describing particular implementations only and is not intended to be limiting. As used in the description of the various described implementations and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" is, optionally, construed to mean "when" or "upon" or "in response to determining" or "in response to detecting" or "in accordance with a determination that," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]" or "in accordance with a determination that [a stated condition or event] is detected," depending on the context.

It is to be appreciated that "smart media display environments" may refer to smart environments for homes such as a single-family house, but the scope of the present teachings is not so limited. The present teachings are also applicable, without limitation, to duplexes, townhomes, multi-unit apartment buildings, hotels, retail stores, office buildings, industrial buildings, and more generally any living space or work space.

It is also to be appreciated that while the terms user, customer, installer, homeowner, occupant, guest, tenant, landlord, repair person, and the like may be used to refer to the person or persons acting in the context of some particularly situations described herein, these references do not limit the scope of the present teachings with respect to the person or persons who are performing such actions. Thus, for example, the terms user, customer, purchaser, installer, subscriber, and homeowner may often refer to the same person in the case of a single-family residential dwelling, because the head of the household is often the person who makes the purchasing decision, buys the unit, and installs and configures the unit, and is also one of the users of the unit. However, in other scenarios, such as a landlord-tenant environment, the customer may be the landlord with respect to purchasing the unit, the installer may be a local apartment supervisor, a first user may be the tenant, and a second user may again be the landlord with respect to remote control functionality. Importantly, while the identity of the person performing the action may be germane to a particular advantage provided by one or more of the implementations, such identity should not be construed in the descriptions that follow as necessarily limiting the scope of the present teachings to those particular individuals having those particular identities.

Although various drawings illustrate a number of logical stages in a particular order, stages that are not order dependent may be reordered and other stages may be combined or broken out. While some reordering or other groupings are specifically mentioned, others will be obvious to those of ordinary skill in the art, so the ordering and groupings presented herein are not an exhaustive list of alternatives. Moreover, it should be recognized that the stages can be implemented in hardware, firmware, software or any combination thereof.

The foregoing description, for purpose of explanation, has been described with reference to specific implementations. However, the illustrative discussions above are not intended to be exhaustive or to limit the scope of the claims to the precise forms disclosed. Many modifications and variations are possible in view of the above teachings. The implementations were chosen in order to best explain the principles underlying the claims and their practical applications, to thereby enable others skilled in the art to best use the implementations with various modifications as are suited to the particular uses contemplated.

What is claimed is:

1. A method of reviewing Internet content channels on a display device, the method comprising:
at a remote control device having a button, a hardware processor, and memory storing instructions for execution by the hardware processor, wherein the remote control device and the display device are associated with a user account maintained at a server:
storing information of a second Internet content channel in the memory of the remote control device;
in response to receiving a user actuation of the button, identifying a first Internet content channel that is currently being displayed on the display device and a sequence of Internet content channels that is associated with the user account in which the first Internet content channel is followed by a second Internet content channel; and
in response to receiving the user actuation of the button, causing the display device to display media content provided by the second Internet content channel based on the stored information of the second Internet content channel in the memory of the remote control device.

2. The method of claim 1, wherein the remote control device is disposed in proximity to the display device.

3. The method of claim 1, wherein the remote control device is configured to control display of media content received from the sequence of Internet content channels on the display device, and the display device is associated with an Internet-enabled casting device configured to receive the media content from the sequence of Internet content channels.

4. The method of claim 3, wherein the Internet-enabled casting device is configured to execute a distinct receiver application to enable display of each Internet content channel of the sequence of Internet content channels on the display device.

5. The method of claim 1, wherein a predetermined channel order of a preferred channel list is customized for the user account, and the first and second Internet content channels are two consecutive programs in the sequence of Internet content channels.

6. The method of claim 5, wherein the sequence of Internet content channels is selected and arranged to the predetermined channel order on a user interface displayed on a client device.

7. The method of claim 1, further comprising:
downloading from the server a preferred channel list; and
storing or updating the preferred channel list in the memory of the remote control device.

8. The method of claim 7, wherein the preferred channel list is downloaded from the server every time when the display device is powered on, every time when an Internet-enabled casting device is powered on, or in response to a user actuation of the button or when the remote control device receives from the server an update command to request an update of the preferred channel list in the remote control device.

9. The method of claim 8, wherein the server is configured to send the update command to request the update of the preferred channel list in the remote control device when the preferred channel list associated with the user account is modified.

10. The method of claim 1, further comprising:
downloading from the server the information of the first Internet content channel; and
storing or updating the information of the first Internet content channel in the memory of the remote control device.

11. The method of claim 1, wherein the remote control device further includes a previous button and a next button that are distinct from each other and from the button, further comprising:
while the media content provided by the second Internet content channel is displayed on the display device, the media content displayed on the display device including a first program provided by the second Internet content channel:
in response to a user actuation of one of the previous and next buttons, generating a program scan request to request display of a second program provided by the second Internet content channel, wherein information of the second program is determined by one of an Internet-enabled casting device, the server and a content host of the second Internet content channel based on a preferred program list associated with the second Internet content channel and information of the first program.

12. The method of claim 11, wherein when the next button is actuated, the second program follows the first program in the preferred program list, and when a backward button is pressed, the second program precedes the first program in the preferred program list.

13. The method of claim 11, wherein the user account is associated with a user review account of the second Internet content channel, and the preferred program list associated with the second Internet content channel includes a sequence of preferred programs arranged according to a predetermined program order customized for the user review account of the second Internet content channel, the first and second programs being two consecutive programs in the sequence of preferred programs.

14. The method of claim 1, wherein the remote control device comprises a plurality of buttons including the button, further comprising:
while the media content provided by the second Internet content channel is displayed on the display device, the media content displayed on the display device including a first program provided by the second Internet content channel:
in response to a user actuation of one of the plurality of buttons on the remote control device, generating a program preview request for displaying a set of preview frames related to the first program.

15. The method of claim 14, wherein the program preview request is generated in accordance with a determination that the user actuation of the one of the plurality of buttons includes a press lasting for a duration of time longer than a threshold time length.

16. The method of claim 1, wherein the remote control device comprises a plurality of buttons including the button, further comprising:
while the media content provided by the second Internet content channel is displayed on the display device, the media content displayed on the display device including a first program provided by the second Internet content channel:
in response to a user actuation of one of the plurality of buttons on the remote control device, generating a backdrop review request for displaying one or more media items related to the media content currently displayed on the display device.

17. The method of claim 16, wherein an Internet-enabled casting device is configured to enable display of the media content of the second Internet content channel by a first receiver application and display of the selected one of the one or more media items by a second receiver application that is distinct from the first receiver application.

18. The method of claim 1, wherein causing the display device to display the media content provided by the second Internet content channel includes transmitting to the server a channel change message including information of the second Internet content channel.

19. An electronic device for reviewing Internet content channels on a display device, wherein the electronic device and the display device are associated with a user account maintained at a server, the electronic device comprising:
  a button;
  a hardware processor; and
  memory storing one or more programs to be executed by the hardware processor, the one or more programs comprising instructions for:
    storing information of a second Internet content channel in the memory;
    in response to receiving a user actuation of the button, identifying a first Internet content channel that is currently being displayed on the display device and a sequence of Internet content channels that is associated with the user account in which the first Internet content channel is followed by a second Internet content channel; and
    in response to receiving the user actuation of the button, causing the display device to display media content provided by the second Internet content channel based on the stored information of the second Internet content channel in the memory of the electronic device.

20. A non-transitory computer readable storage medium storing one or more programs to be executed by hardware processor of an electronic device for reviewing Internet content channels on a display device, wherein the electronic device and the display device are associated with a user account maintained at a server, the one or more programs comprising instructions for:
  storing information of a second Internet content channel in a memory of the electronic device;
  in response to receiving a user actuation of a button, identifying a first Internet content channel that is currently being displayed on the display device and a sequence of Internet content channels that is associated with the user account in which the first Internet content channel is followed by a second Internet content channel; and
  in response to receiving the user actuation of the button, causing the display device to display media content provided by the second Internet content channel based on the stored information of the second Internet content channel in the memory of the electronic device.

* * * * *